United States Patent
Bregler et al.

(10) Patent No.: US 11,373,127 B2
(45) Date of Patent: *Jun. 28, 2022

(54) CONNECTION MULTIPLEXING FOR A PARALLEL PROCESSING ENVIRONMENT

(71) Applicant: SAP SE, Walldorf (DE)

(72) Inventors: Jonathan Bregler, Kraichtal (DE); Alexander Bunte, Heidelberg (DE); Arne Harren, Walldorf (DE); Andreas Kellner, Birkenau-Löhrbach (DE); Daniel Kuntze, Bruchsal (DE); Vladislav Leonkev, Sandhausen (DE); Simon Lueders, Walldorf (DE); Volker Sauermann, Dossenheim (DE); Michael Schnaubelt, Eimen (DE); Le-Huan Stefan Tran, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,644

(22) Filed: Nov. 20, 2020

(65) Prior Publication Data

US 2021/0073700 A1    Mar. 11, 2021

Related U.S. Application Data

(63) Continuation of application No. 15/221,706, filed on Jul. 28, 2016, now Pat. No. 10,891,570.

(Continued)

(51) Int. Cl.
    *G06Q 10/06*       (2012.01)
    *G06F 16/21*       (2019.01)
    (Continued)

(52) U.S. Cl.
    CPC ....... *G06Q 10/06316* (2013.01); *G06F 16/21* (2019.01); *G06F 16/217* (2019.01);
    (Continued)

(58) Field of Classification Search
    CPC ................................................ G06Q 10/06316
    See application file for complete search history.

(56) References Cited

U.S. PATENT DOCUMENTS 6,321,234 B1    11/2001   Debrunner
7,627,671 B1 *   12/2009   Palma ................. G06F 11/3616
                                                        709/223

(Continued)

OTHER PUBLICATIONS

Xuli Liu, Exploiting Object-Based Parallelism on Multi-Core Multi-Processor Clusters, Eighth International Conference on Parallel and Distributed Computing, Applications and Technologies, Date of Conference: Dec. 3-6, 2007, Date Added to IEEE Xplore: Jan. 7, 2008, pp. 259-266 (Year: 2007).*

(Continued)

*Primary Examiner* — Andre D Boyce
(74) *Attorney, Agent, or Firm* — Fish & Richardson P.C.

(57) ABSTRACT

Systems and methods are disclosed for connection multiplexing in a parallel processing environment. An example method includes requesting, responsive to a request to perform multiple database operations in a single transaction, a connection identifier for a physical connection to the database, providing the connection identifier to each of a plurality of workers, and performing the multiple database operations using the plurality of workers. Each worker may obtain a work item from a work queue, initiate a database request for the work item, and provide the database request to a database server. The database request represents one of the multiple database operations and includes the connection identifier. The database server may determine that the connection identifier corresponds to the physical connection, add the request to a connection queue associated with the physical connection, and execute requests from the connection queue against the database via the physical connection.

20 Claims, 20 Drawing Sheets

Related U.S. Application Data

(60) Provisional application No. 62/333,426, filed on May 9, 2016.

(51) Int. Cl.
    *G06F 16/23*     (2019.01)
    *G06F 16/2458*     (2019.01)
    *G06F 16/2455*     (2019.01)
    *G06F 16/901*     (2019.01)

(52) U.S. Cl.
    CPC ...... *G06F 16/2365* (2019.01); *G06F 16/2471* (2019.01); *G06F 16/24553* (2019.01); *G06F 16/9024* (2019.01); *G06Q 10/067* (2013.01); *G06Q 10/06311* (2013.01); *G06Q 10/063118* (2013.01)

(56) References Cited

U.S. PATENT DOCUMENTS

| | | | |
|---|---|---|---|
| 8,037,453 B1 | 10/2011 | Zawadzki | |
| 9,417,985 B2 * | 8/2016 | Baars | G06F 11/3604 |
| 9,489,630 B2 * | 11/2016 | Achin | G06Q 10/067 |
| 9,557,879 B1 * | 1/2017 | Wang | H04L 41/12 |
| 9,600,269 B1 | 3/2017 | Bregler et al. | |
| 9,652,714 B2 * | 5/2017 | Achin | G06N 20/00 |
| 9,659,254 B2 * | 5/2017 | Achin | G06Q 10/04 |
| 9,710,262 B2 | 7/2017 | Bregler et al. | |
| 9,996,330 B2 | 6/2018 | Bregler et al. | |
| 10,114,626 B2 | 10/2018 | Bregler et al. | |
| 10,187,260 B1 * | 1/2019 | Chen | G06F 9/45558 |
| 10,333,820 B1 * | 6/2019 | Wang | H04L 41/12 |
| 10,891,570 B2 | 1/2021 | Bregler et al. | |
| 10,984,367 B2 * | 4/2021 | Achin | G06N 20/00 |
| 2004/0172626 A1 * | 9/2004 | Jalan | G06F 8/456 717/149 |
| 2004/0215733 A1 | 10/2004 | Gondhalekar et al. | |
| 2005/0262183 A1 | 11/2005 | Colrain et al. | |
| 2007/0169042 A1 * | 7/2007 | Janczewski | G06F 9/526 717/149 |
| 2007/0299980 A1 * | 12/2007 | Amini | H04L 49/90 709/231 |
| 2008/0005392 A1 * | 1/2008 | Amini | H04L 65/80 710/29 |
| 2011/0225565 A1 | 9/2011 | Velzen et al. | |
| 2012/0216105 A1 | 8/2012 | Poddar et al. | |
| 2012/0290706 A1 * | 11/2012 | Lin | G06F 9/5011 709/224 |
| 2015/0339572 A1 * | 11/2015 | Achin | G06N 5/04 706/46 |
| 2016/0086260 A1 | 3/2016 | Vermeulen et al. | |
| 2016/0335550 A1 * | 11/2016 | Achin | G06F 9/5011 |
| 2016/0364647 A1 * | 12/2016 | Achin | G06N 5/02 |
| 2017/0076488 A1 * | 3/2017 | Stanton | G06T 13/60 |
| 2017/0243140 A1 * | 8/2017 | Achin | G06N 5/04 |
| 2017/0323247 A1 | 11/2017 | Bregler et al. | |
| 2017/0357703 A1 | 12/2017 | Theimer et al. | |

OTHER PUBLICATIONS

Final Office Action issued in United States U.S. Appl. No. 15/221,706 dated Apr. 15, 2020, 45 pages.

Kim et al., "A database server for distributed real-time systems: Issues and experiences." Second Workshop on Parallel and Distributed Real-Time Systems. IEEE, 1994, 10 pages.

Liew et al., "A framework for business model driven development." 12 International Workshop on Software Technology and Engineering Practice (STEP'04), IEEE, 2004, 8 pages.

Non-Final Office Action issued in United States U.S. Appl. No. 15/221,706 dated Oct. 18, 2019, 36 pages.

* cited by examiner

CONNECTION MULTIPLEXING FOR A PARALLEL PROCESSING ENVIRONMENT

CLAIM OF PRIORITY

This application claims priority under 35 USC § 120 to U.S. Non-Provisional patent application Ser. No. 15/221,706 filed Jul. 28, 2016, entitled "Connection Multiplexing for a Parallel Processing Environment"; which claims priority under 35 USC § 119(e) to U.S. Provisional Patent Application Ser. No. 62/333,426, filed May 9, 2016, entitled "Self-Organizing Parallel Deployment of Database Artifact"; the entire contents of each and together in their entirety, are hereby incorporated by reference.

BACKGROUND

Large database systems, such as enterprise resource planning ("ERP") systems, and customer relationship management ("CRM") can include database objects that store and organize data, as well as database objects for accessing the data. For example, in some database systems a database object may include a table, an index, and a view, as well as a procedure for accessing one or more tables, importing data into one or more tables, or a calculation view that manipulates the data in one or more tables. One example of such a database is the High-Performance Analytic Appliance ("HANA"), which is a column-oriented, in-memory database appliance available from SAP SE, Walldorf, Germany. HANA supports both column-based and row-based storage. Pushing down data-intensive computations into the database layer minimizes data transfers between the database layer and an application layer and takes advantage of in-memory capabilities, which are becoming more common. Because the database objects of such a system include procedures and other objects for manipulating the data, an application developer may develop some of the database objects themselves. Such a process may include developing design-time artifacts that are deployed to the database as run-time objects. For example, the developer, and/or a database administrator, may at design time develop or revise one or more database artifacts that are then deployed to the database as a run-time database object. The deployment of a database artifact may result in one or more database objects and the deployment of multiple database artifacts can result in one database object. Thus the relationship between development database artifacts and run-time database objects may be one-to-one, one-to-many, many-to-one, or many-to-many.

Each developer and database administrator may deploy one or more database artifacts in a container, which is a separate database schema and acts as a sandbox to insulate database objects from deployment and run-time errors of other containers. A container may be generated and maintained for specific application tasks and may, thus, represent deployment actions and data elements related to a real-world or conceptual object, such as a sales order, an invoice, a schedule, etc. For example, a container may be generated for sales orders and may include instructions for performing specific tasks on the data related to sales orders, as well as instructions defining the data itself. Containers can be user-specific or group specific. Containers may access other containers via a private synonym, if the other container enables such access. Containers may be complex, with hundreds or even thousands of database artifacts, making manual deployment of the artifacts difficult and time consuming.

SUMMARY

Systems and methods are disclosed for parallelized deployment of database artifacts. Automatic deployment may be accomplished via a Deployment Infrastructure. The deployment infrastructure may be a service layer of the database that simplifies the deployment of database artifacts. In some implementations, the database may be a HANA database and the deployment infrastructure may be referred to as HANA DI. The deployment infrastructure can provide a declarative approach for defining database objects (as design-time artifacts, also referred to as database artifacts) and ensure a consistent deployment into the database, based on a transactional all-or-nothing deployment model and implicit or automatic dependency management. The deployment infrastructure can use parallel processing to deploy artifacts in a self-organizing manner.

DETAILED DESCRIPTION

Figure 1:
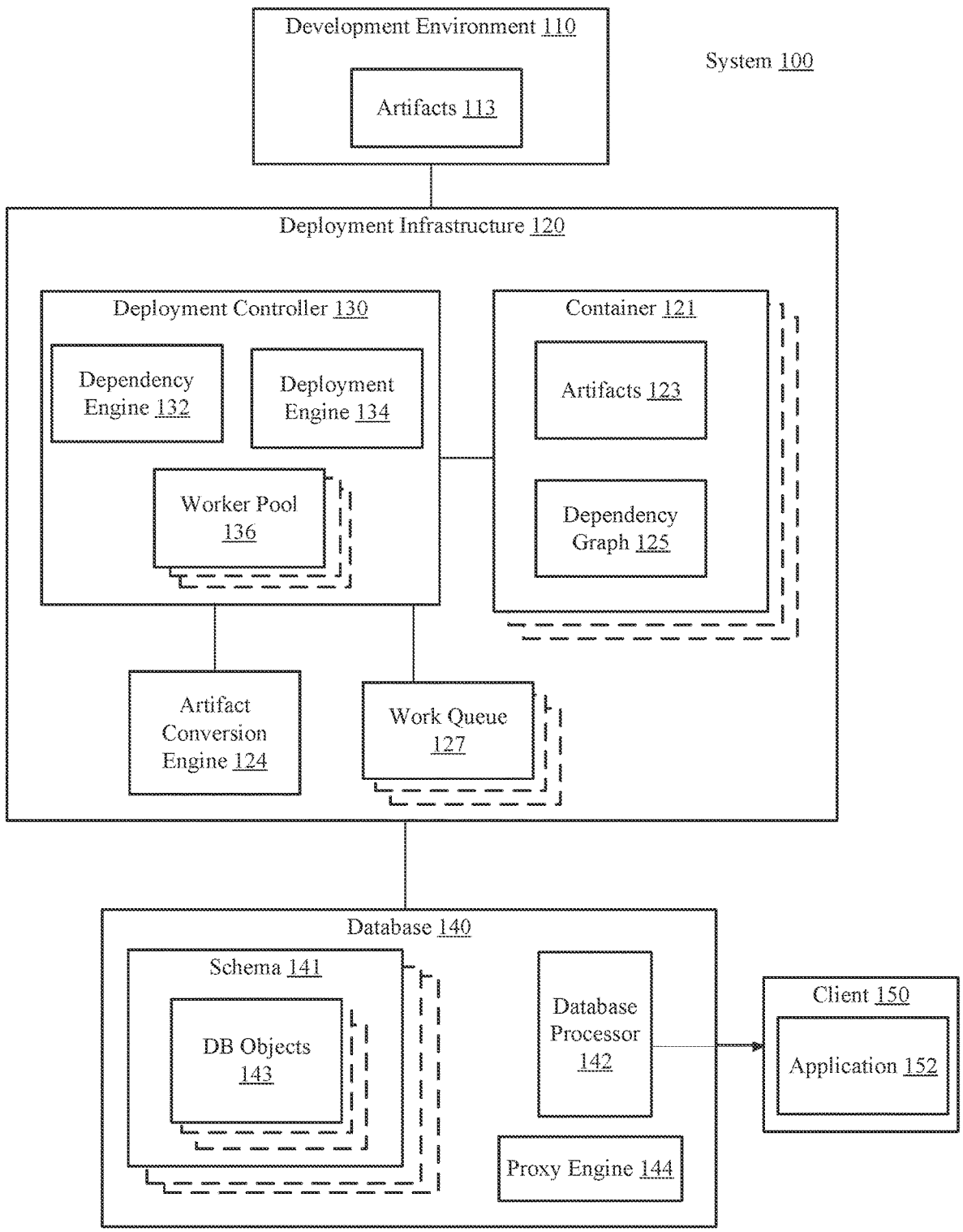
FIG. 1 is a block diagram of a system for parallelized deployment of database artifacts, consistent with disclosed implementations.

A deployment infrastructure system focuses on deployment aspects and addresses both development and modeling scenarios for a database. Implementations may handle development and modeling of database artifacts for deployment into the database as run-time database objects. Artifacts can include things like tables, views, indexes, core data services ("CDS"), calculation views, procedures, and so forth. In some implementations the deployment infrastructure system does not support non-database artifacts like JavaScript programs, OData artifacts, etc. Such artifacts can may be handled by an application layer. An example of an application layer is extended services ("XSA") for a HANA database.

In some implementations, deployment of database objects via the deployment infrastructure is based on a container model where each container corresponds to a database schema. Containers can be used for multiple deployments of the same database artifacts, and for development sandboxes. Containers may be isolated against each other by database means, e.g. each database schema with its deployed database objects is owned by a per-schema technical user. The technical user may be separate from a container owner to allow the separation of privileges for deployment and runtime access to deployed database objects. Thus, security aspects for deployment need only to consider technical users. A technical user can be for a specific container and may represent a user used by the deployment infrastructure, e.g., deployment infrastructure 120 of FIG. 1, as discussed below, to communicate with the database, e.g., database 140 of FIG. 1, and to deploy the artifacts as database objects into the database. A technical user is not a developer. Technical users decouple ownership from developers, i.e., the created database objects are owned by a technical user. Technical users may be used internally by the deployment infrastructure 120 and the database 140 and may be created as restricted database users, who do not have any default privileges. Thus, by default cross-container access at the database level may not be possible; but can be granted via database privileges. In addition to the schema-based containers, the deployment infrastructure system may also use database schemata to isolate its metadata, for example separating definition of artifacts from the deployed database objects.

In some implementations, some database objects are written in a schema-free way, or in other words, without explicit schema references. This allows deployment of the same database objects into different containers because database objects reference other database objects only via object names without schema reference. The containers may be created by users who have the privilege to call a specific SQL API function for creating a container. Such a privilege can be granted by a database administrator. Database objects deployed using the deployment infrastructure in a container can thus be deployed by any user who has the privilege to call a specific SQL API function of the desired container for deploying design-time artifacts. In such implementations, references to schema-external objects may be created via synonyms (or table links in case of Zero-Downtime Maintenance ("ZDM")) that are bound during deployment. The synonyms (or table links) provide schema-local names for the schema-external objects. Privileges on these schema-external objects can be explicitly granted to the container's technical user, e.g. SELECT-WITH-GRANT-OPTION privileges on schema-external ERP tables.

Deployment Infrastructure System

FIG. 1 illustrates a block diagram of an example deployment infrastructure system 100, according to disclosed implementations. The system 100 may be used to deploy design-time artifacts to create run-time objects that can be accessed by applications. The system 100 may include a database 140, a deployment infrastructure 120, and a development environment client 110. The development environment client 110 may include functionality from one or more development tools, such as a deployment infrastructure client, an extended services development infrastructure component, and an extended services deployment component. The development environment client 110 may be communicatively coupled with the deployment infrastructure 120. In some implementations, the development environment client 110 may access the deployment infrastructure 120 via a proxy (not shown) that insulates the deployment infrastructure 120 from direct access by the development environment client 110. In some implementations, the deployment infrastructure 120, the proxy, and the database 140 may be part of a database cluster. Deployment-related activities, such as staging of files, triggering of real deployment into a single container, etc., can be performed by a dedicated technical deployment user. As indicated above, the technical deployment user of the container can be different from the technical runtime user of the schema to allow separation of privileges for deployment and/or runtime access to the deployed database objects.

The development environment client 110 may enable the generation and maintenance (revision) of design-time artifacts 113. The design-time artifacts specify a definition of one or more database objects in a declarative way. In other words, the design-time artifacts represent the target state of the database objects rather than using the imperative CREATE, ALTER, and DROP statements, which are conventionally used to generate database objects. The use of declarative statements for artifacts 113 not only enables the creation of run-time database objects, but also facilitates modeling a networked set of artifacts, such as tables, sequences, views, procedures, functions, data flows, etc. as design-time artifacts. In some implementations, not all artifacts have a one-to-one relationship to a SQL statement. For example, calculation views may result in multiple database objects and table data (e.g., a table import artifact) might be provided via CSV text files or even binary files which do not correspond to SQL. Thus a single artifact may result in deployment of one or multiple database objects, and multiple artifacts can result in deployment of a single database object. The database objects deployed from an artifact may be controlled by the artifact conversion engine 124. The design-time artifacts simplify a dependency-based deployment, re-deployment, and un-deployment, and facilitate lifecycle management aspects. For example, using design-time artifacts enables separation of the steps of 1) uploading the artifacts into deployment infrastructure (staging), and 2) deploying the artifacts to the database. Artifacts 113 also simplify incremental deployment because only modified design-time artifacts are uploaded and deployed rather than every artifact in the container.

When a user of the development infrastructure, e.g., a developer, is ready to deploy the design-time artifacts 113 from the development environment client 110 to the deployment infrastructure 120, the developer may create a container 121 for the artifacts to reside in. A container 121 represents a database schema 141 in the database 140 and is a work space that can be owned and accessed by a single user or a group of users (e.g., a single developer or a group of developers). The container 121 includes container metadata, such as companion containers (i.e. companion schemata), technical users authorized to access the schema, etc. Companion containers are other containers that have database artifacts the container wants to access. A synonym in the container 121 enables the container 121 to access artifacts in the other container, i.e., the companion container. Metadata for a container 121 may, thus, identify run-time user privileges (e.g., for technical users of other containers), a container owner, or dependencies between design-time artifacts.

In some implementations, database objects are deployed in schema 141, which corresponds to a container. Thus, each container 121 has a corresponding schema 141. Each container 121 also may include other components such as a metadata schema, which may contain items such as a version number. In some implementations, a single deployment only operates on a single container 121 and the container boundary is a deployment boundary. In other words, affected database objects 143 inside other database schemata 141 (e.g., schemata that do not correspond with the container being deployed) are not re-deployed and deployment does not fail if database objects inside other schemata break. The container-based deployment of the deployment infrastructure system 100 enables the system to use transactional deployment. In other words, the deployment infrastructure system 100 may perform deployment modification of database objects 143, including DDL and DML operations and all re-deployments of affected objects, inside a single database transaction. In some implementations, sub-transactions do not exist. In other implementations, sub-transactions may be used for further optimization, e.g., to commit some parts of the deployment. Thus, the system 100 does not need compensation operations in case of rollbacks because these are handled by the database as part of the transaction management. As indicated above, some database objects 143 may be deployed outside of a schema 141, e.g., ERP objects that are created beforehand outside the container schema, e.g., they have been manually created in another schema or deployed in another container.

The user creating the container 121 may upload the artifacts 113 from the development environment client 110 to the deployment infrastructure 120, which adds artifacts 123 to the container 121. Once the artifacts 123 are loaded into the container 121 a user may begin the deployment of the artifacts 123 within that container 121. In some implementations the deployment may be initiated via a make or deployment process. The deployment process may be directed by a deployment controller 130 of the deployment infrastructure 120. The deployment controller 130 may be instructions stored in one or more memories that, when executed by one or more processors formed in a substrate, cause the deployment infrastructure to perform certain operations. The deployment controller 130 may include one or more engines, which also may be referred to as "build plug-ins", that take the artifacts 123 in the container 121, determine dependencies for the artifacts 123, determine an order of deployment for the artifacts 123, and initiate generation of appropriate schema 141 and database objects 143 in accordance with existing authorization and syntactical requirements. In other words, the deployment controller 130 accomplishes deployment of the artifacts 123 in the container 121 in an automatic and transactional manner, providing error messages as appropriate, and eliminating the need for any user to manually determine the proper order of deployment for the artifacts 123.

Figure 3:
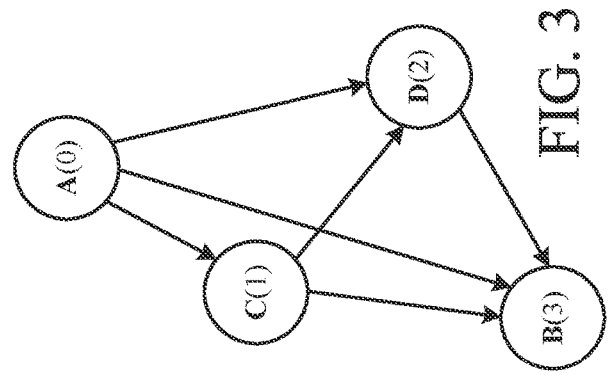

In some implementations, the deployment controller 130 may include a dependency engine 132. The dependency engine 132 may oversee generation of a dependency graph 125 for the artifacts 123 in the container 121. The dependency graph 125 represents a proper order of deployment for the artifacts 123. In the dependency graph 125 a root node may be an artifact that is itself not dependent on any other artifact. It is possible for the dependency graph 125 to have multiple root nodes. FIG. 3 illustrates an example dependency graph. In FIG. 3, artifact A is a root node because artifact 4 is not dependent on any other artifact (e.g., has no incoming edges). Although FIG. 3 is depicted with incoming edges representing a dependency, some implementations may use outgoing edges rather than incoming edges to represent a dependency in the dependency graph 125. The dependency engine 132 may generate the dependency graph 125 by generating a node for each artifact 123 in the container 121 and extracting dependency information from the declarative statements in the artifacts 123 themselves. In some implementations, the dependency engine 132 may update the dependency graph 125 by adding additional dependency edges, also referred to as push-forward edges. In some implementations, such additional push-forward edges may be added by an artifact conversion engine 124.

In some implementations, the dependency engine 132 may build the dependency graph 125 via phases, including an expand phase, a precompile phase, a merge phase and a build phase. In the expand phase the system may expand complex objects into separate artifacts. For example, a synonym artifact may be expanded into a synonym artifact and a configuration artifact. The configuration artifact is of a different artifact type than the synonym artifact. Thus an expand phase enables one artifact in artifacts 113 to be deployed as multiple database objects 143. In the precompile stage the system may determine dependencies in each artifact. In some implementations, the precompile may generate two lists for each artifact—a provides list and a requires list—which are used to build a dependency graph. In the merge phase the system may combine two artifacts into one artifact e.g., merging an optional synonym configuration artifact and a synonym artifact into a synonym artifact with an explicit configuration. As another example, if a synonym has a default configuration artifact and an explicit configuration, the merge phase may result in the combination of the two artifacts into one combined configuration artifact. Thus, the merge phase may enable two artifacts defined in artifacts 113 (or generated as part of the expand phase) to be implemented as one database object 143. In some implementations, the system may perform a precompile phase after the merge phase and after the expand phase. In some implementations, the merge phase may occur after the expand phase. In the build phase the system may build the dependency graph with the backward edge count and push-forward edges using the information generated during the precompile phase(s). Deployment of the artifacts may take place during a walk-graph stage. In some implementations, each stage can utilize parallel processing.

The deployment controller 130 may also include a deployment engine 134. The deployment engine 134 may direct the deployment of artifacts 123 to database objects 143 using the dependency graph 125. The deployment controller 130 may use the dependency graph 125 to calculate the order in which the database objects need to be created, and to detect missing and/or required objects, as well as to find and report attempted unauthorized access of artifacts outside the container (e.g., via synonyms). In addition, the deployment engine 134 may use dependencies to re-deploy database objects that are affected by newly deployed or modified objects.

The deployment controller 130 (e.g., the dependency engine 132 and deployment engine 134) may work with an artifact conversion engine 124 in deployment of artifacts 123. In some implementations, the interpretation of artifacts including the extraction of dependencies and the steps taken to implement a target-state-based deployment of the artifacts is done by the artifact conversion engine 124, which includes deployment directives for each artifact type. In other words, the artifact conversion engine 124 may be formed from instructions, e.g., a build plugin, for a table artifact type, a plugin for a view artifact type, a plugin for a table import artifact type, etc. The plug-ins may be different files, different procedures, or just different portions of the artifact conversion engine 124. Each build plug-in may be a program or piece of code that executes the various build phases (precompile, merge, and expand) and transforms a design-time artifact into a run-time database object. In some implementations, an application developer may provide the plug-in for an artifact type. In some implementations, the artifact conversion engine 124 may have access to a deployment container 121 via a SQL-based API only. Commands that the artifact conversion engine 124 needs for creating/altering/dropping a database object may be available at the SQL layer of the database 140. These SQL commands may take the database security constraints into account. In transactional deployment, the DDL and DML, statements may run inside a single database transaction in non-auto-commit mode. In some implementations, the database 140 may be insulated from the artifact conversion engine 124. For example, the artifact conversion engine 124 may issue commands via the deployment controller 130 to the database 140 rather than directly to the database 140. Such implementations insulate the database 140 from the artifact conversion engine 124 by having the deployment controller 130 (or another controller, such as database processor 142) check commands for authentication or syntax errors prior to executing the commands.

In some implementations, the deployment controller 130 may improve the functioning of the system 100 by using parallel processing to deploy the artifacts 123. In other words, the deployment controller 130 may improve the processing of the system 100 by speeding up the deployment of the artifacts 123. When the container 121 includes hundreds or thousands or artifacts 123, parallel processing may result in a substantial reduction in the deployment time. When the deployment controller 130 includes parallel processing, the deployment controller 130 may start one or more worker threads in a worker pool 136. The worker pool 136 represents the worker threads available for deploying the container 121. In other words, the worker threads in the worker pool 136 are available for deploying the artifacts 123 of the container 121. The deployment engine 134 may place artifacts 123 ready for immediate deployment (meaning any artifacts 123 not waiting on a dependency to be deployed) on the work queue 127. The worker threads in worker pool 136 may pull an artifact from the work queue 127 and deploy that artifact, e.g., initiating generation of one or more database objects 143. When all artifacts 123 have been deployed (or the transaction has failed and rolled back), the deployment controller 130 may close the work threads.

The system may also include database 140. The database 140 may be a database server that supports a variety of conventional database object types, such as tables, views, indexes, etc., as well as non-conventional database object types, such as procedures, calculation views, synonyms, etc. In some implementations, the database 140 is an in-memory column-oriented database, such as HANA, where HANA supports both column-based and row-based storage. The database 140 may include various database processors 142, which can include a database processor that communicates with an optional deployment infrastructure proxy engine 144, a structured query language ("SQL") processor, etc. In some implementations, the development environment client 110 may use the proxy engine 144 to access the deployment infrastructure 120. In some implementations, the proxy engine 144 may periodically query the deployment infrastructure 120 to determine if the deployment infrastructure 120 is still running. If the proxy engine 144 determines the deployment infrastructure 120 has crashed, it may update a status flag for any open database connections to false, indicating that the transactions (e.g. the make requests) running on those connections have finished and may also update a status indicating the transactions were not successful.

In some implementations, the deployment controller 130 can communicate with the database processor 142 via an internal application programming interface (e.g., HANA's internal EAPI Thin Layer SQL client) on a new database transaction. This new transaction may not be related to the database transaction in which the deployment infrastructure command is sent to the database 140. The SQL communication from deployment infrastructure 120 towards the database 140 can be a trusted communication which can allow the deployment infrastructure 120 to execute SQL statements on behalf of different technical users inside a single database transaction in order to implement different security features at the database layer.

In some implementations, the system 100 can provide an SQL-based API for the deployment infrastructure 120 that can be accessed via a standard SQL connection, where the API can be exposed at the SQL layer. In some implementations, the system 100 may include a higher-level privileged container management API that allows the creation and deletion of schema-based containers and a container-level deployment API that allows applications and/or lifecycle management tools to deploy/un-deploy artifacts within a container. In some implementations, the system may keep the deployment controller 130 and the artifact conversion engine 124 isolated in its own operation system process.

In some implementations, the database 140 may include a proxy engine 144. The proxy engine 144 may handle communications between the deployment controller 130 and the database processor 142. For the purposes of decoupling, the deployment infrastructure 120 can provide database procedures for its APIs. Communication from the database 140 towards the deployment infrastructure 120 can be provided via a proxy library that can be loaded into the database 140. The proxy library may include a status table that has an entry for each make process. The proxy engine 144 can implement database procedures and/or client-side of a deployment infrastructure network protocol. All incoming requests can be routed to the deployment infrastructure process using this network protocol.

In some implementations, the deployment infrastructure can be constrained by at least one of the following deployment architectural boundaries: database services, application programming interfaces, and technical users. For example, some database services may not allow access to database objects 143 by other schema. As another example, some technical users may not be granted access while others may be granted access to a schema 141. The database processor 142 may check these deploy-time conditions and issue an error if an attempt is made to violate a deployment boundary. In some implementations, the deployment infrastructure 120 may create the required metadata, database users, and/or database roles inside the database 140 to support the database service instance.

Although illustrated in FIG. 1 as separate from the database 140, in some implementations, the deployment infrastructure 120 can also be included in the database 140 or included in a database cluster that also includes the database 140.

Parallelized Deployment

Figure 2:
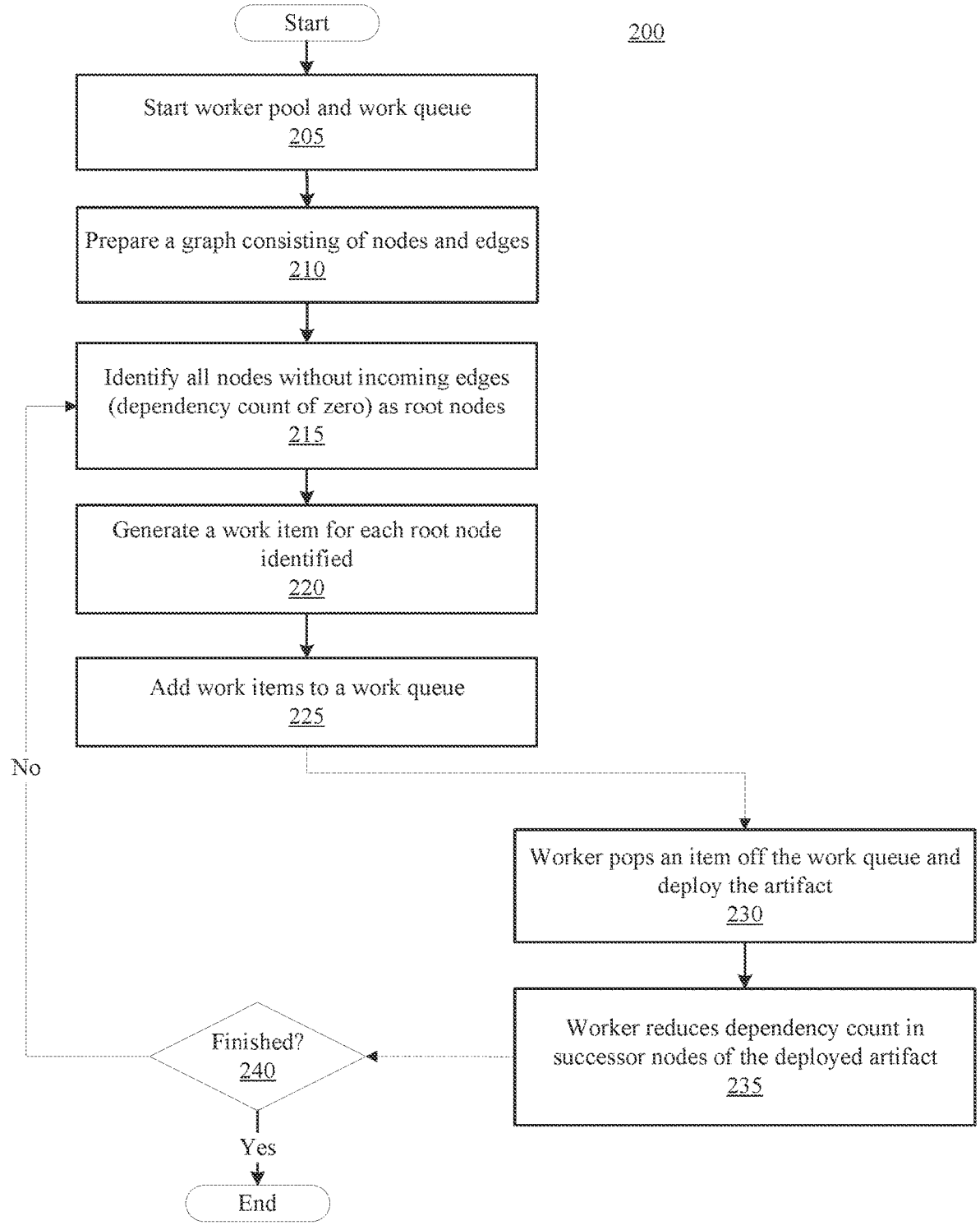
FIG. 2 illustrates a flowchart of an example process 200 for parallelized deployment of database artifacts, consistent with disclosed implementations.

FIG. 2 illustrates a flowchart of an example process 200 for parallelized deployment of database artifacts, consistent with disclosed implementations. The process 200 may be performed by a deployment infrastructure system, such as system 100 of FIG. 1. In parallelized deployment, the system deploys the design-time artifacts to database objects faster than when the deployment is serial (essentially performed by one worker). The system may use parallel deployment at each phase of the deployment process.

Process 200 may begin with creation of the worker pool and work queue (205). For example, the system may create a work queue and workers for a worker pool in response to a make command, which initiates the deployment process. Each worker may have a context, which stores information for the workers, e.g., the objects for writing log messages, database connections, etc. Thus, the work queue and worker pool are started/created for the deployment of the artifacts in a container and may exist for the life of the deployment process. Each worker may be capable of generating work items. A work item may be a deployment phase (e.g., precompile, expand, merge, make, etc.) operation for one design-time artifact of a specific type to be handled by a corresponding build plug-in. In some implementations, the system may determine how many work items will be deployed. This enables the system to determine when the work queue is empty and no additional work items will be pushed to the work queue. In some implementations, the exact number of work items to be deployed may not be known or may be too expensive to calculate. In such implementations, the system may use a maximum number, which can be reduced during the deployment process.

The deployment order of artifacts in a container is driven by information about the database runtime objects that are provided (deployed) by each artifact and which other objects are required by those deployed objects. Based on this information, the system generates a dependency graph that the system uses to determine in which order to deploy artifacts (210). In some implementations, the dependency graph preparation may be accomplished in stages; an expand phase, precompile phase(s), a merge phase, and a build graph phase. The dependency graph shows dependencies between artifacts by connecting artifacts that provide a particular database object upon deployment to the artifacts that consume the corresponding deployed database object. The nodes in a dependency graph represent artifacts to be deployed in a database (e.g., database 140) and the edges represent the dependencies between the artifacts. An artifact is a design-time resource that may result in a deployment of one or more database objects. For example, an artifact may be of a table, view, full-text index, procedure, sequence, synonym, table import, etc., type. In some implementations, the artifact may be a file that uses data definition language ("DDL")-style syntax to define tables, views of tables, etc. or may include SQL-style syntax to populate tables, etc. Thus the artifacts themselves may specify use of another artifact, creating an edge in the dependency graph. In some implementations, a list of other artifacts that an artifact requires is generated, e.g., during a precompile phase. In addition to the dependencies generated from the graph itself, the system may add additional "push forward" edges. Push forward edges may be edges added to the dependency graph based on the artifact type and not on dependencies specified in the artifact itself. In some implementations, the artifact conversion may add the push forward edges during a build graph phase of the deployment process.

FIG. 3 illustrates an example database artifact dependency graph. In the graph illustrated in FIG. 3, there are four nodes representing artifacts A, B, C, and D. Artifacts B, C, and D all depend on artifact A. This means that before deployment of artifacts B, C, and D, the deployment infrastructure has to deploy artifact A; otherwise errors will occur because sooner or later some required artifact will not yet be deployed. In the same way, artifact D also depends on artifact C, so artifact C must be deployed before D, etc. In some implementations, the edge between artifact C and artifact D may be a push forward edge, e.g., an edge added based on the artifact types of C and D rather than on anything specified or identified by the artifacts themselves. One example of a push forward edge is a table import artifact and a view artifact for the same table. For example, it is possible that after a view is deployed, a sequence that includes a RESET BY query can be deployed that uses the view to select from the table. But if the table does not yet contain all relevant values, a wrong value may be selected by the sequence as an initial value for the RESET BY query. Because the view artifact does not reference the table import artifact, there is no way to ensure that this potential error does not occur. To address this potential error, the artifact deployment engine (e.g., a table import build plug-in) may know that its artifacts should be deployed before any view artifacts for the same table. Thus, during the build graph phase the table import plug-in may add the dependency edge between artifact C and artifact D. As deployment can include thousands of such artifacts, the deployment order can be complex and too difficult to do manually in an acceptable timeframe.

Figure 4:
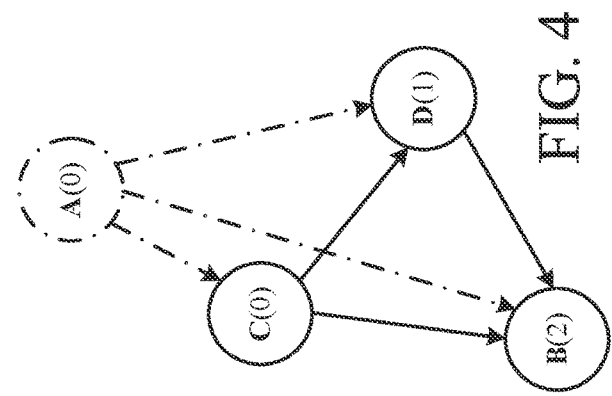
FIGS. 3-5 are example dependency graphs, consistent with disclosed implementations.
Figure 5:
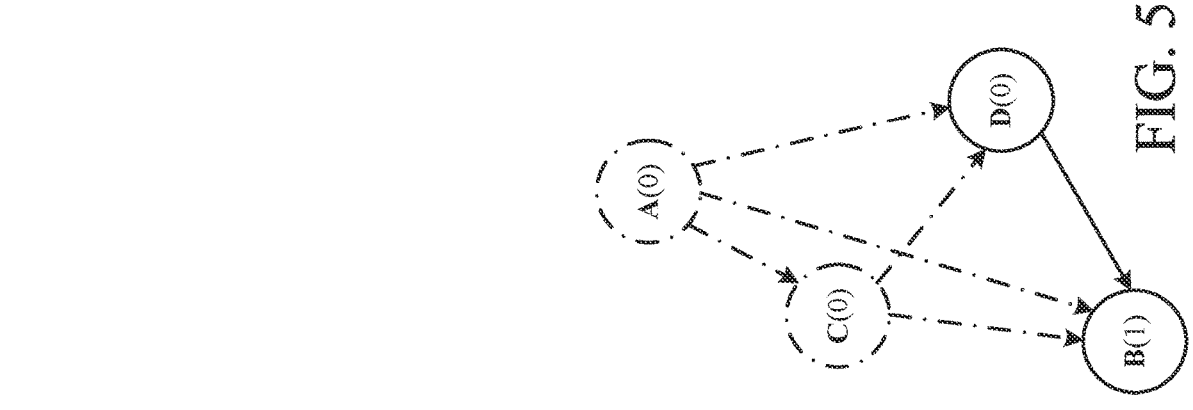

In FIG. 3, the numbers in parenthesis represent the number of incoming/required dependencies an artifact has. In other words, artifact B has three dependencies (on A, C, and D), while artifact A has none. This number may be referred to as a dependency count. The dependency count for a particular artifact represents the number of artifacts that must be deployed before the particular artifact can be deployed. In some implementations, the dependency count may be the number of backward edges the particular node has in the graph. The system may track, via the dependency graph, the dependency count for each node in the graph. The system may update the dependency count as artifacts are deployed. For example, after a root node is deployed, it is no longer relevant to the graph, so the system reduces the dependency count of any successor nodes of the deployed root node. FIG. 4 illustrates the graph of FIG. 3 after deployment of artifact A. In the example of FIG. 4, artifact A and the outgoing edges of artifact A are disregarded or removed from the graph, as indicated by dashed lines. The system reduces the dependency count for nodes B, C, and D. The system may continue to deploy any nodes with a zero dependency count. For example, as illustrated by FIG. 4, artifact C now is a root node and may be deployed. The deployment and subsequent reduction of dependency counts results in the graph illustrated in FIG. 5. Deployment is complete once all artifacts represented by the nodes in the dependency graph have been deployed. In the example illustrated by FIGS. 3-5 the deployment order automatically determined by the system is A, C, D, B.

The artifact deployment described above can be done sequentially, exactly in the deployment order calculated from the graph. So, using the example of FIGS. 2-5, the system deploys artifact A, then C, then D, then B sequentially. However, if a container, and thus the dependency graph, includes hundreds or even thousands of artifacts, such a deployment would take an unrealistic amount of time. Thus, disclosed implementations of a deployment infrastructure may run artifact deployment in parallel, which improves the speed at which the system can deploy the artifacts.

In implementations that build the dependency graph in stages, the system may push the work items from each stage to the work queue because all work items in these stages are independent from each other. Thus, the work items from any of the dependency graph building stages can be run in parallel. Each worker (e.g., implemented as a thread) can pop an item from the queue and process it, making these stages execute faster.

When the system begins the walk graph stage, e.g., after the dependency graph has been generated, the system may identify each node in the dependency graph that has a dependency count of zero (215) The system may then generate a work item for each node with dependency count zero (220), or in other words each identified root node. In the example dependency graph of FIG. 3, only node A is a root node (has a dependency count of zero) and the system generates a work item only for node A. In some implementations, a work item may be a work item class that implements a generic "process( )" method. In addition to the process( ) method, the work item class may also implement a process( ) method to process a list of work items. The work item class may also implement a process or flag to indicate whether the work item allows combined processing and/or a process or flag that indicates whether a particular work item can be combined with a given item. The following is an example work item class definition:

```
class PrecompileWorkItem : public hdi::kernel::worker::WorkItem
{
public:
    PrecompileWorkItem(SharedWorkItemContext&
    sharedWorkItemContext,
        hdi::buildplugin::BuildPluginAutoHandle plugin,
        const hdi::kernel::buildplugin::BuildPluginInfo& pluginInfo,
        hdi::buildplugin::CompileUnitHandle compileUnit,
        Diagnose::TraceTopic& traceTopic,
        ltt::allocators allocator);
    void process(hdi::kernel::worker::WorkerContext& workerContext);
protected:
    SharedWorkItemContext& m_sharedWorkItemContext;
    hdi::buildplugin::BuildPluginAutoHandle m_plugin;
    const hdi::kernel::buildplugin::BuildPluginInfo& m_pluginInfo;
    hdi::buildplugin::CompileUnitHandle m_compileUnit;
};
```

As indicated above, the context includes information such as objects for writing log messages, database connections, etc. As each work item represents a specific deployment phase for an artifact of a specific type, the work item may take as a parameter a build plugin (or an identifier for functionality in the artifact conversion engine) that handles deployment tasks for artifact type of the work item. The following is an example of a work item process method for a precompile stage:

```
void PrecompileWorkItem::process(hdi::kernel::worker::WorkerContext& workerContext)
{
    ltt::allocator_handle pluginAllocator =
m_allocator.createSubAllocator(m_pluginInfo.getBuildPluginId( ).getName( ).c_str( ));
        hdi::buildplugin::BuildPluginEnvironment bpEnv(m_pluginInfo,
            m_sharedWorkItemContext.m_accessProvider,
            m_sharedWorkItemContext.m_logContext,
            m_sharedWorkItemContext.m_pluginParameters,
            m_sharedWorkItemContext.m_fileProvider,
            m_traceTopic, *pluginAllocator);
    bpEnv.setProcessingMessage(HDI::MSG_HDI_MAKER_PRECOMPILING,
HDI::MSG_HDI_MAKER_PRECOMPILING_OK);
    bpEnv.setNumberOfJobs(1);
    ltt::vector<hdi::buildplugin::CompileUnitHandle> cuList(m_allocator);
    cuList.push_back(m_compileUnit);
    m_plugin->precompile(cuList, bpEnv);
    if (bpEnv.hasErrors( )){
        // ignore; precompiler will check error count from log context
    } else {
        bpEnv.checkJobCompletion( );
    }
}
```

Figure 6A:
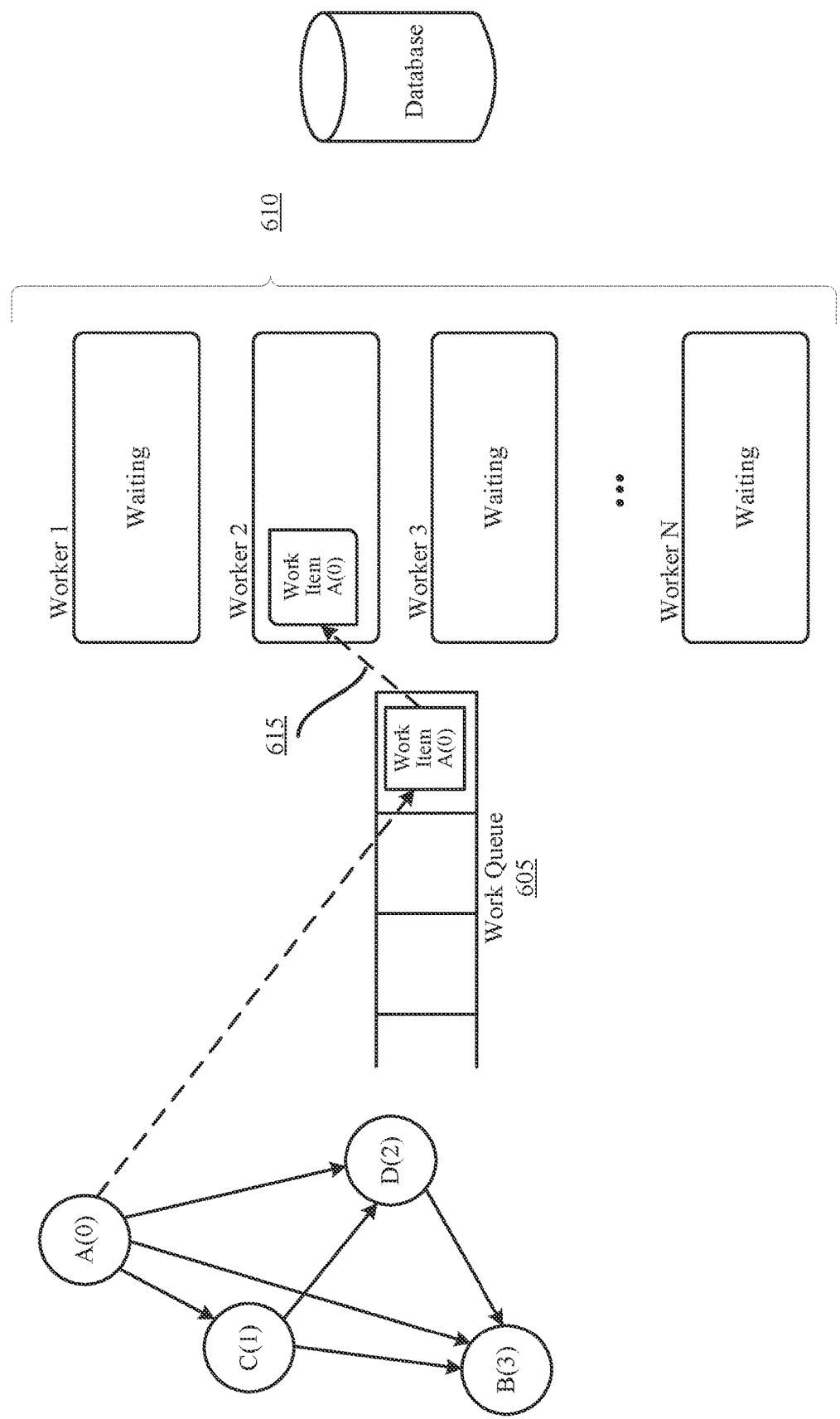
FIGS. 6A to 6D are block diagrams that illustrate an example work queue and worker threads used for parallelized deployment of database artifacts, consistent with disclosed implementations.

After generating the appropriate work items (e.g., the root nodes that have a zero dependency count), the system then adds the work items into a work queue (225). The system may have several workers, e.g., 1 to N where N is preconfigured, already running and waiting for work. FIG. 6A illustrates the work queue 605 and waiting workers in the worker pool 610. The pool of workers 610 can be a generic component based on a producer-consumer concept. In some implementations, the worker pool 610 is independent from the deployment process and its phases (e.g., expand, precompile, merge, etc.), so that the workers can be used in any of the stages. As indicated above, a main thread may start the worker pool 610 and create the work queue 605 (as part of step 205). The following is an example of a worker that can be used in implementations of the deployment infrastructure system:

```
void Worker::run(Execution::Context& self, Execution::JobObject&
myJobObject)
{
    try {
        hdi::db::ThreadLocalDBStore
        threadLocalDBStore(m_allocator);
        m_workerContext.initialize(threadLocalDBStore);
        WorkItemList workItems(m_allocator);
        while (m_workerContext.pop(workItems)) {
            if (m_workerContext.isCancelled( )) {
                break;
            }
            if (workItems.empty( )) {
                continue;
            }
            workItems.front( )->process(m_workerContext,
            workItems);
        }
    }
    catch (const hdi::base::HDIBaseException& ex)
    ...
}
```

In some implementations, the system may keep track of the number of items yet to be pushed on the work queue. This number may enable a worker to distinguish between the need to wait for more items when an empty queue is encountered and the need to die when the queue is empty and there are no more work items to be pushed. In some implementations, when the main thread starts the worker pool 610, it may know the number of nodes in a dependency graph and may set the number of items to be pushed to that number. In some situations, the number of items to be pushed may be unknown or too expensive to calculate in advance. In such situations, the system may set the number of items to be pushed to a maximum number. This maximum number may be reduced by the main thread when it detects that fewer items will be pushed. In other words, once the main thread is able to determine the number of items to be pushed, the system may update the number of items with this number. The workers may be configured to update the number of items, e.g., decrementing the number of items to be pushed as it pops work items off the work queue 605.

As soon as work items arrive in the work queue 605, an idle worker can fetch the item from the work queue 605 and process the work item (e.g., item 615 of FIG. 6A). The workers in the worker pool 610 can be implemented via threads, tasks, etc., so that work can be done on different threads. This way, the work items may be processed in parallel. The dashed line in FIG. 2 between 225 and 230 represents the handoff to a worker. It is understood that any of the workers 1 to N may pick up an item from the queue 605, so steps 230 and 235 run in parallel on different worker threads.

Figure 6B:
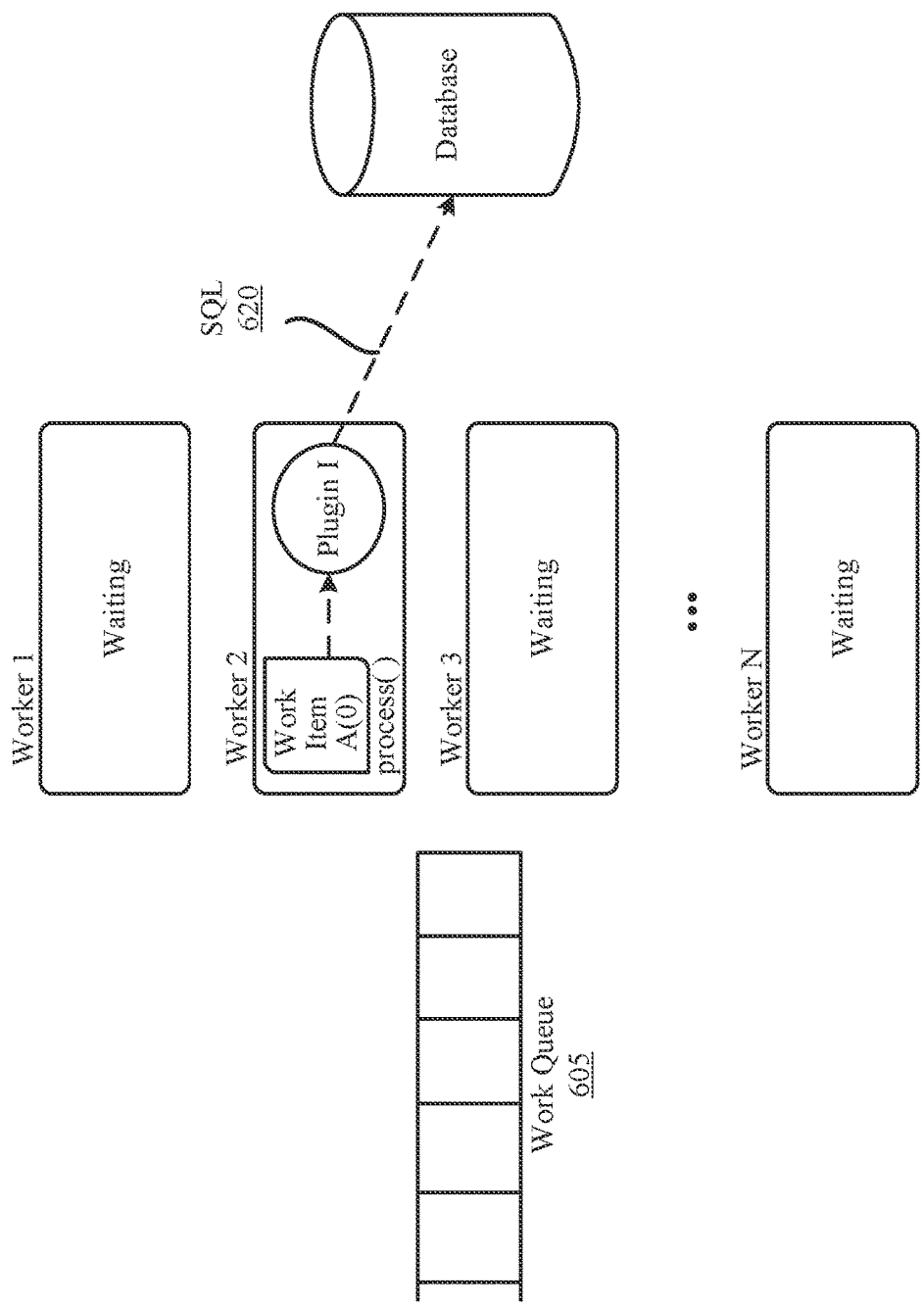
Figure 6B:
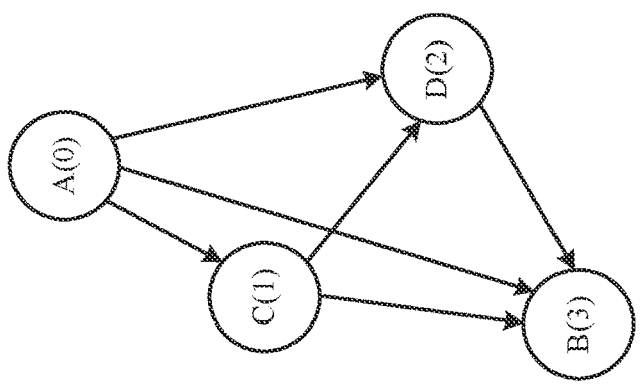

When the work item has been taken by a worker, the work item is removed from the work queue (230), as illustrated in FIG. 6B. Now the system can deploy the artifact represented by the work item (235). In some implementations, the worker may call the process( ) method of the work item class, which receives the work item as input parameter. Within the process( ) method the node data, which is mainly data referring to the artifact to be deployed, is passed to a plugin (or other portion of an artifact conversion engine), such as Plugin I of FIG. 6B. In some implementations, a separate plugin library exists for each artifact type (e.g., procedure, view, table, table import, sequence, synonym, full-text index, etc.). These plugin libraries are specific to each artifact type. A plugin knows how to evaluate the information (i.e., the artifact data) passed to it and how to process that data. For example, for a deploy action, the plugin may know how to generate, from this data, the SQL statements 620 required to deploy a specific artifact in the database. In the example of FIG. 6B, the process( ) method calls Plugin I (a plugin corresponding to the artifact type of node A), which generates SQL statements 620 in order to deploy the requested artifact as a database object in the database.

Figure 6C:
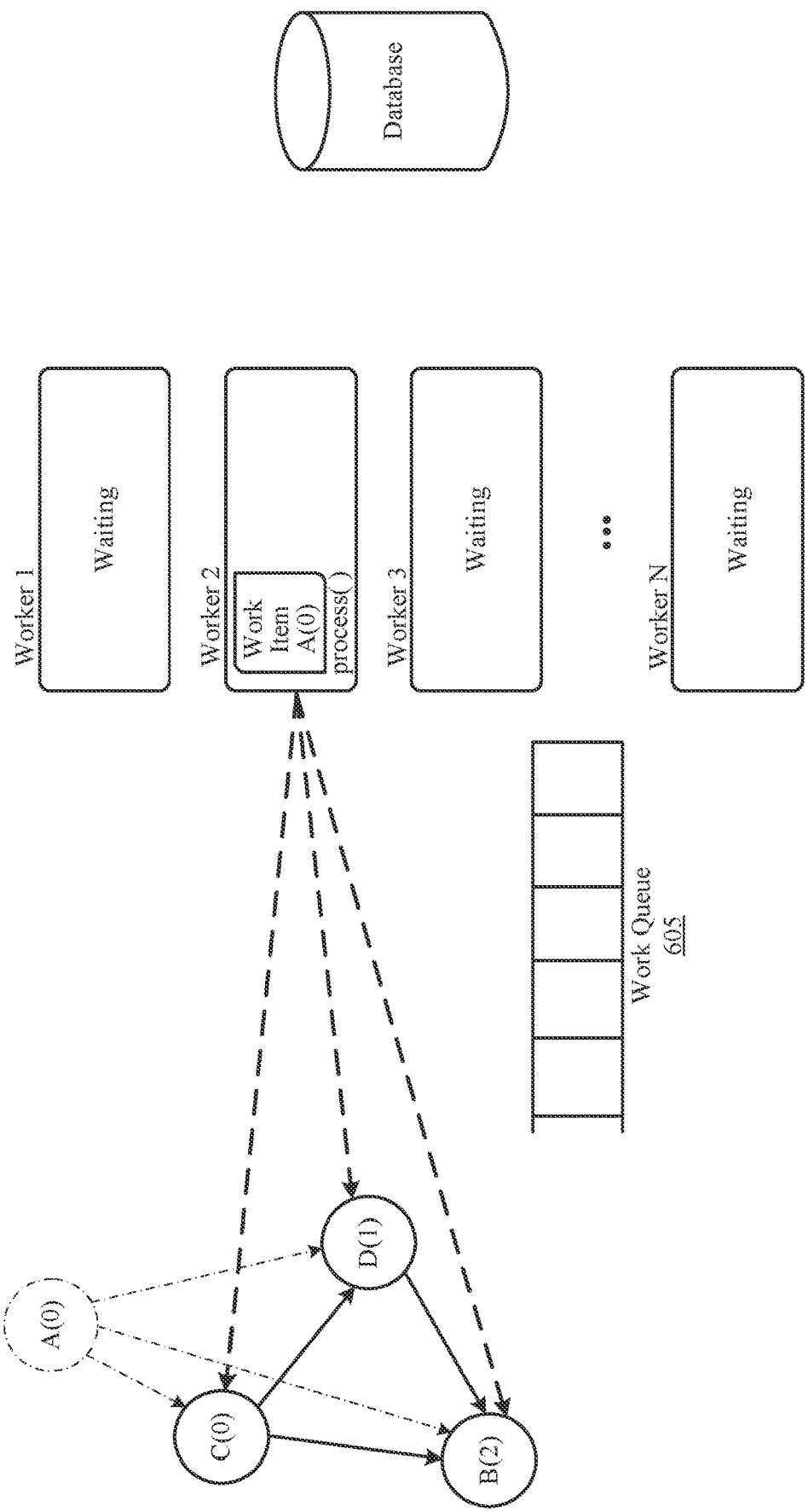

After successful deployment of the artifact in the database, the process( ) method on the worker continues with updating the dependency count counters in all its successor graph nodes (235), as illustrated in FIG. 6C. In the example of FIG. 6C, the successors of node A are nodes B, C, and D and in each of the successor nodes, the process( ) method reduces the dependency count by 1. Because node A has been deployed, there are no dependencies any more originating from node A, creating a new node with a dependency count 0, node C, which is now ready for processing. Once the process( ) method of the work item class updates the dependency count, the process in the worker ends, and the work item is removed from the worker (e.g., from worker 2 of FIG. 6C).

Figure 6D:
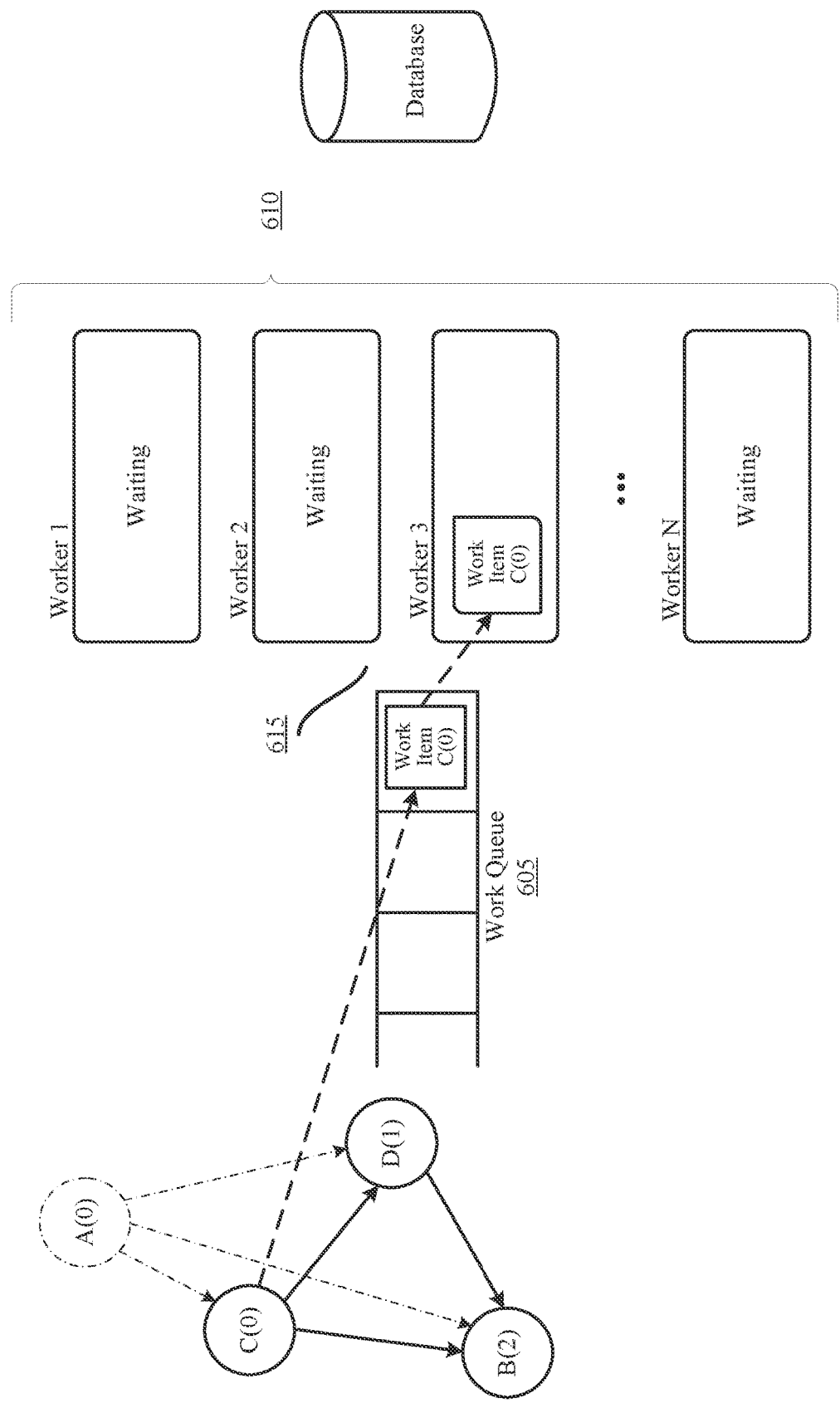

When a worker has finished, the system may determine whether processing of the dependency graph is finished (240). If it is not, the system may identify any nodes with a dependency count of zero (215). This step may be running continuously. In other words, the main thread may be continuously looking for nodes in the dependency graph with a dependency count of zero. In the example of FIG. 6D, the next node that is now ready for processing (e.g., node C) has a work item generated (220) and put into the work queue (225). Of course, several nodes may be ready and may thus be put into the queue. This means that in general the queue 605 can contain many work items. A free worker (e.g., worker 3 in FIG. 6D), may take the work item from the work queue 605 and call the process( ) method, as described above. Process 200 continues as described above until all nodes in the dependency graph have been deployed (240, Yes). In some implementations, the system may know that all nodes in the dependency graph have been deployed based on the number of items yet to be pushed. For example, the worker may call a reduce method to reduce the number of items yet to be pushed when it pops a work item from the work queue or when it updates the dependency count. In other implementations, the main thread may call the reduce method when it places an item on the work queue. When this count reaches zero and all workers are free, the system may determine all artifacts have been deployed. Process 200 then ends, having automatically determined a deployment order in a parallelized manner.

A feature of parallel deployment as described herein is that the work items themselves (inside the process( ) method) update the dependency count of the dependency graph nodes. This eliminates the need to calculate the deployment order of the graph beforehand. Instead, one of potentially several possible deployment orders of the graph nodes happens automatically, of its own accord. Starting with the root nodes, each node drags its successor nodes into the queue, via the process( ) method updating the dependency count, and this way step by step, node by node, just as they get ready, all nodes are processed. In other words, the dependency graph does not directly decide the order in which the nodes are processed, and the work queue, nor the workers, decide the order. The nodes are placed into the work queue 605 at the right moment, automatically. The parallel deployment described herein is a self-regulating, self-organizing mechanism. It organizes itself in a way that a maximum degree of parallelism on the available workers is guaranteed. For example, when just 1 worker is available, the system would end up processing the nodes sequentially, so that the deployment order would correspond to a pre-calculated sequential order. In some implementations, as will be explained herein, the workers can create work items instead of the main thread doing this.

The system may generate the pool of workers at the beginning of a make( ) process. Thus, the workers are available for all phases of the make, including the expand, merge, and precompile phases. The work items in the expand phase are not dependent on each other, so each item may be placed immediately on the queue and processed in parallel by the workers. The same goes for the work items in the merge phase and the work items in the precompile phase. In some implementations, the work items in the merge phase and the work items in the expand phase may also be independent of each other and these two phases can be processed in parallel. In some implementations a precompile phase may determine initial dependencies and one or more precompile phases may follow the expand and merge phases because these phases can change the artifacts (e.g., add additional artifacts or decrease the number of artifacts). Thus, parallelization can speed the run time of the phases that come before the build graph and walk graph phases of a make( ) process.

Modification Deployments

Figure 7:
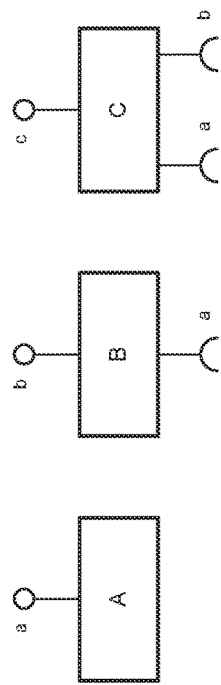
FIGS. 7 to 13 are block diagrams illustrate an example of deployment of a database artifact may result in the redeployment of additional artifacts, consistent with this disclosure.

As indicated above, artifacts in a container may be modified and redeployed. Such modifications may require the redeployment of other artifacts. FIGS. 7 to 13 illustrate an example of deployment of a database artifact may result in the redeployment of additional artifacts, consistent with this disclosure. As illustrated in FIG. 7, the system may assume three artifacts A, B, and C where artifact A provides an object a, artifact B provides object b and requires object a, and artifact C provides object c and requires objects a and b. The three artifacts could have the same artifact type (A=B=C), or three different types (A≠B≈C and A≠C), or two different types (A=B≠C, A≠B=C, A=C≠B). All artifact types could be handled by the same build plugin or different build plugins.

Figure 8:
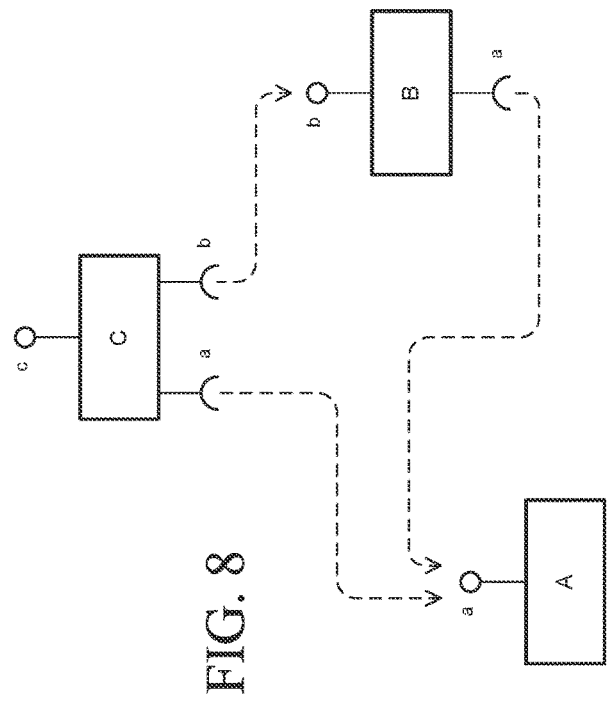
Figure 9:
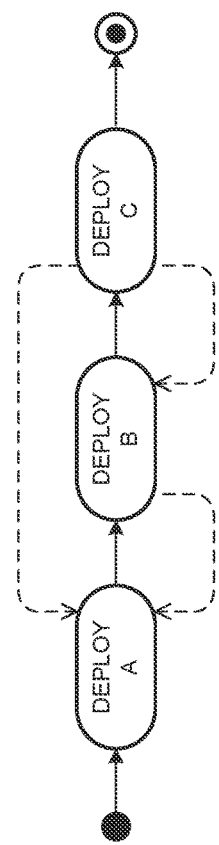

FIG. 8 illustrates dependencies between the three artifacts shown in FIG. 7. As illustrated in FIG. 8, artifact C depends on artifacts A and B, and artifact B depends on artifact A, and artifact A depends on no other artifact. The directed, dashed lines in FIG. 8 illustrate the dependencies in a depends-on fashion. Based on these dependencies, the system determines the execution graph for an initial deployment of the three artifacts as shown in FIG. 9. An execution graph is a concrete step-by-step ordered graph for the deployment where a node represents a work item and an action and the directed edges represent the order of deployment. As illustrated in FIG. 9, artifact A needs to be deployed first, followed by artifact B, and finally artifact C can be deployed.

At times, the system may handle modification deployments. In a modification deployment, the system deploys a new version of an existing artifact. Deployment of modified artifacts can be handled via two different strategies. In a first strategy, referred to as the "DEPLOY" strategy, the build plugin gets the modified, new version of the artifact and can react accordingly, e.g., issue ALTER statements towards the database. In the second strategy, referred to as the "UNDEPLOY-DEPLOY" strategy, the old artifact gets dropped from the database and the modified, new version of the artifact gets created in the database. The same strategies apply to the revalidation of artifacts which happens when artifacts which provide required objects are modified (or revalidated).

Figure 10:
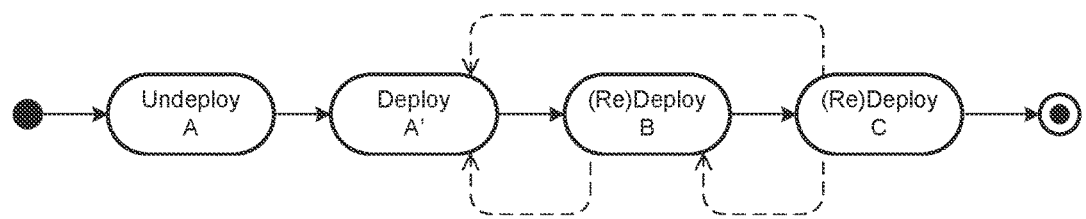

FIG. 10 illustrates an execution graph for a modification of artifact A of FIG. 7 where the build plugin for artifact A uses the "UNDEPLOY-DEPLOY" strategy for modifications, and the build plugins for artifacts B and C use the "DEPLOY" strategy for revalidations: First, artifact A gets undeployed, then the modified artifact A' gets deployed, and then artifacts B and C get (re)deployed, because the artifact A has changed to A'.

Figure 11:
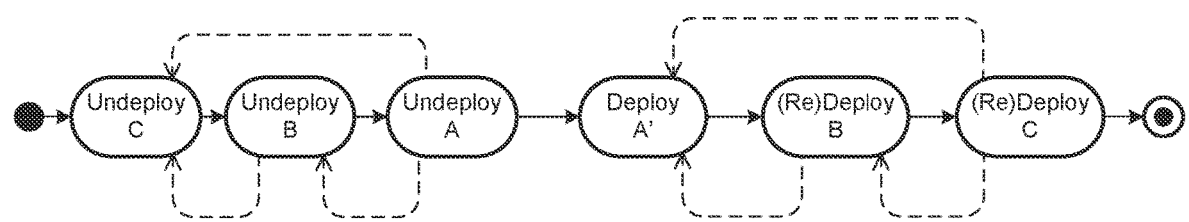

FIG. 11 illustrates the execution graph for the modified artifact A' where all build plugins use the "UNDEPLOY-DEPLOY" strategy (for modifications and revalidations). Based on the dependencies, first artifact C, then artifact B, and then artifact A get undeployed. Then, the modified artifact A' is deployed, and the non-modified artifacts B and C are (re)deployed (due to their revalidation).

Figure 12:
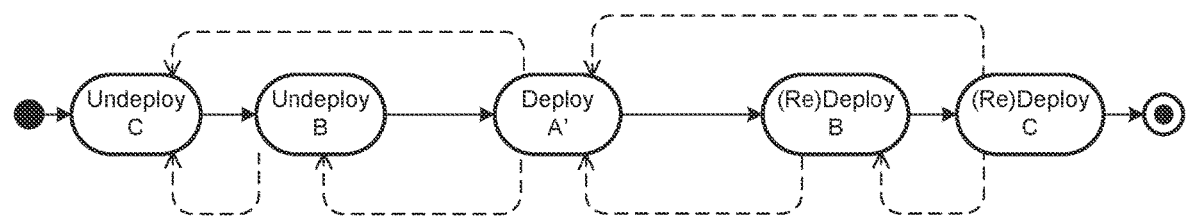
Figure 13:
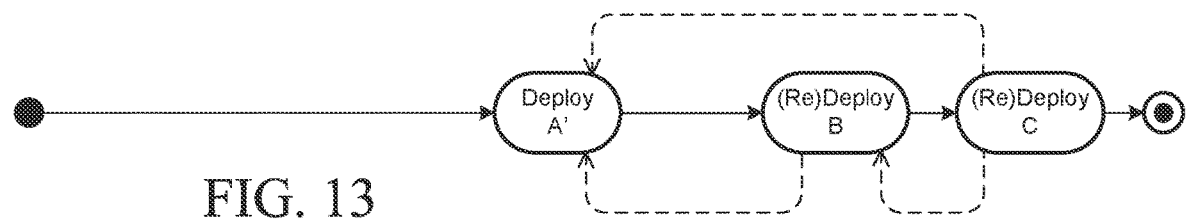

FIG. 12 illustrates how the execution graph looks like in case the build plugin for the modified artifact A' uses the "DEPLOY" strategy for modifications, and the other plugins still use the "UNDEPLOY-DEPLOY" strategy for revalidations. FIG. 13 illustrates the execution graph where all involved build plugins always use the "DEPLOY" strategy (for modifications and revalidations). Each node in the execution graph may represent an artifact type and a build phase (e.g., a deploy, or undeploy phase).

The processing of graph nodes and the deployment of the corresponding artifacts in a database has to be processed in a way that takes into account the node dependencies and thus the required deployment order. Implementations described above offers a parallel, self-organizing walk through the graph nodes and deployment of the artifacts. In some implementations, the system may improve the performance of parallel graph node processing by reducing the number of database roundtrips through combined processing of work items in the work queue. In some implementations, the system may improve the performance of parallel graph node processing by reducing the number of database roundtrips through prefetching graph nodes. Combined processing and Prefetching may be used independently from each other, or both at the same time.

The more work items are bundled together in one worker, the smaller is the degree of parallelism, because one thread is used per worker. However, in some implementations the plugins may be able to do internal optimizations in a way that the processing time for a bundle of work items is smaller than the sum of the processing times for the single work items. Furthermore, not all work items can be combined and processed in bundles. But for those can be bundled, bundling of work items allows for combined processing and leaves more threads at disposal for those work items which have to be processed as single work items. This effect increases parallelism and leads to better performance. The exact behavior may be hard to predict because it depends on the morphology of the given dependency graph and the parameter settings, like the number of workers, the maximum number of work items the queue may combine, the maximum number of prefetch nodes, the number of plugins that allow combined processing at all, etc. Depending on the given implementation, there might be further parameters.

Combined Processing in Parallelized Deployment

One potential disadvantage of parallelized deployment may be that each single work item calls a corresponding plugin, and each plugin sends one to several SQL requests to the database. This may result in many roundtrips per work item between the deployment infrastructure and the database, and such roundtrips can be expensive and/or slow. One way to improve performance of the system is to reduce the number of database roundtrips as far as possible.

Figure 14A:
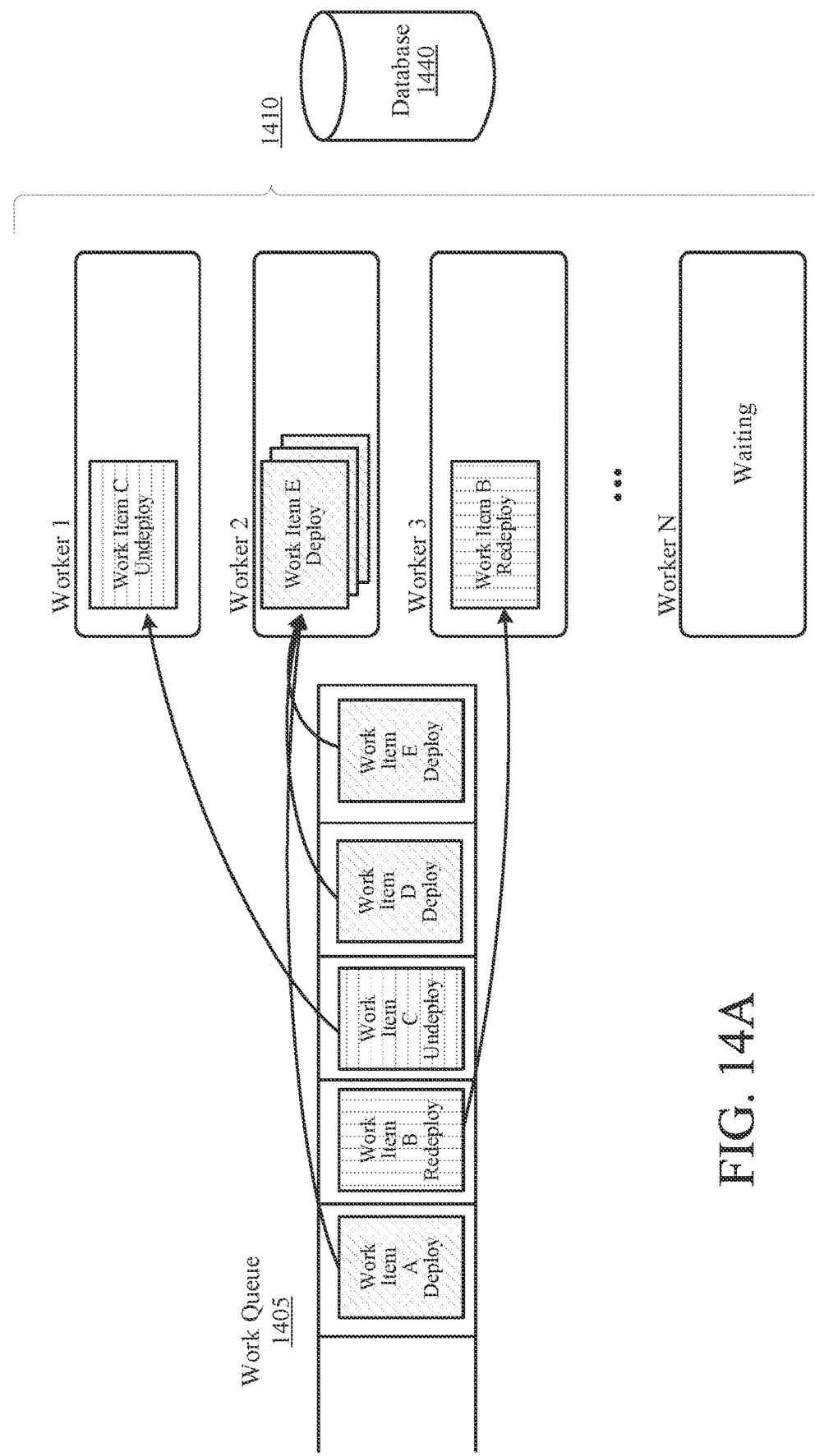
FIGS. 14A and 14B illustrate an example of achieving processing performance improvement by reducing the number of database roundtrips, according to an implementation.
Figure 14B:
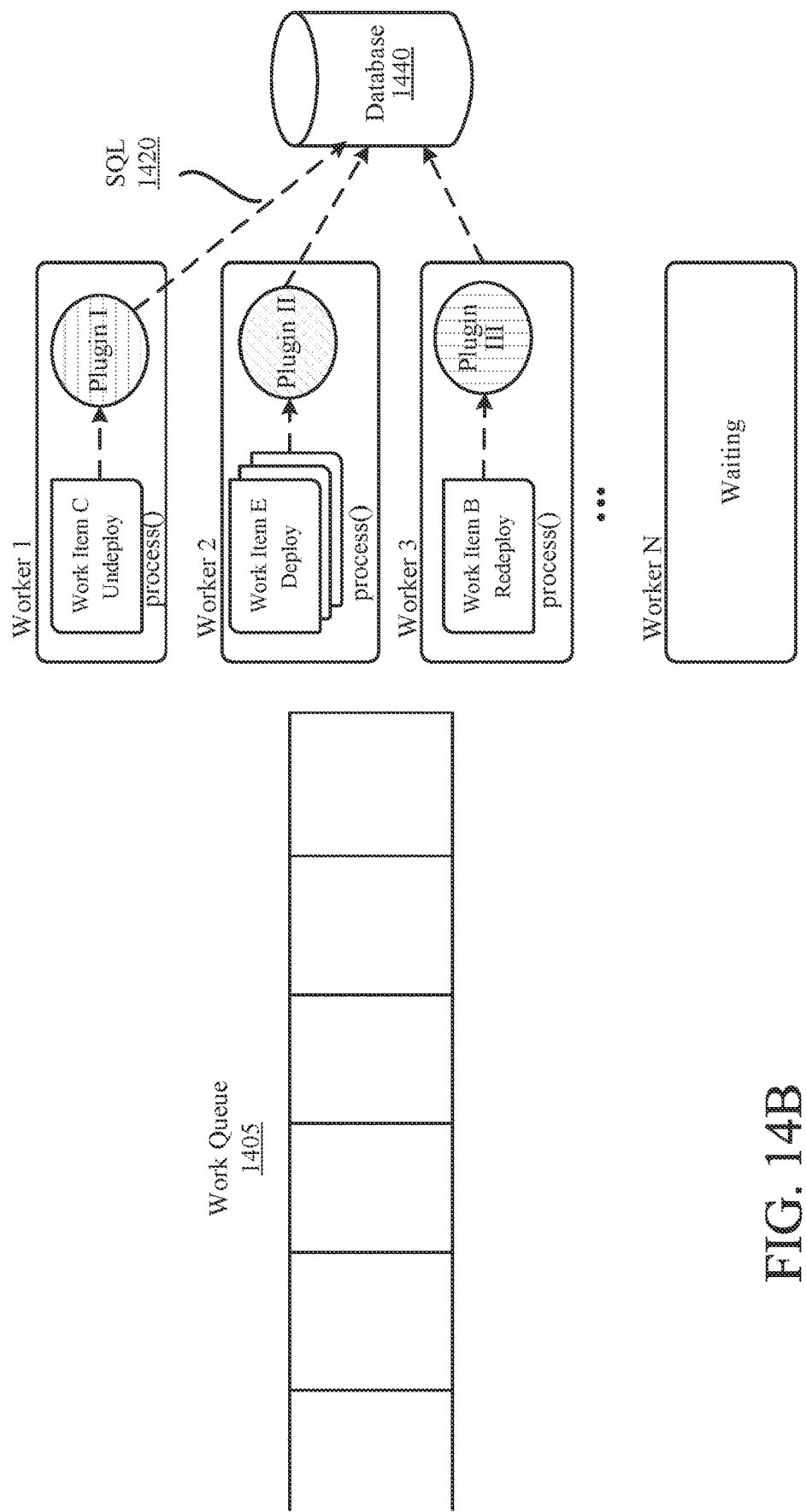

FIGS. 14A and 14B illustrate an example of achieving processing performance improvement by reducing the number of database roundtrips, according to an implementation. Here, the work queue contains several work items which trigger different deployment actions for the artifacts, like undeploy, deploy, redeploy in the database. Furthermore, the work items are for different artifact types and therefore related to different plugins. For example, Work Items A, D, and E relate to Plugin II, Work item B refers to Plugin III, and work item C refers to Plugin I. As discussed above, the plugins may be associated with a type of the artifact being deployed/undeployed/redeployed.

In the example of FIG. 14A, the work items are taken out of the work queue 1405 at the right side and are assigned to one of the workers 1410 that are waiting. In some implementations, all plugins may support combined processing. In some implementations only some of the plugins may support combined processing. In such implementations, the system may have a way to determine whether a particular plugin supports combined processing. For example, each plugin may set an internal combined processing flag, which may be queried from outside. The combined processing flag indicates whether combined processing is supported by the plugin. This flag is not visible in FIG. 14A.

In the example of FIG. 14A, each time a work item is fetched from the queue, the system may check the combined processing flag of the target plugin. If the flag is true, the worker may check to see if one or more of the other work items in the work queue 1405 is of the same artifact type for the same deployment action. In other words, if Work Item A were for a redeploy action instead of a deploy action, it could not be combined with Work Item D and Work Item E. In the example of FIG. 14A, each of the diagonal striped work items calls Plugin II with deployment action deploy and the combined processing flag for Plugin II is true. Thus, in this example, the system bundles these thee work items and passes the three work items to a plugin as bundle. This is possible because all work items in the work queue are ready for deployment, or in other words each work item corresponds to a node with a dependency count of zero. Work item order in the work queue doesn't matter because all items are ready for immediate deployment so the system can select work items from the work queue with the same plugin and deployment action. The maximum number of work items the work queue might select and combine for processing in a worker may, of course, be a configurable number.

Once a worker has a bundle of work items, the worker deploys the work items in the bundle, e.g., performing steps 230 and 235 of FIG. 2, with the difference that the worker calls the process( )method of the work item class (e.g., the plugin for the artifact type represented by the bundled work items) and passes one or several work items to it. In the example of FIG. 14B, on worker 2 the information from the three work items is passed into Plugin II at once. Because the plugin has the information about the three work items it may perform optimizations in its internal processing. For example, the processing of N work items takes less time than the sum of the processing times of N single work items. Optimally, the plugin may execute the same number of SQL statements for N work items as for 1 work item. In other words, even as the number of work items in a bundle increases, the number of database roundtrips remains the same. By combining work item processing in the plugins it is possible to save many database roundtrips, which increases the performance of the deployment of all artifacts represented by the graph nodes as compared with parallel processing alone.

Pre-Fetching in Parallelized Deployment

Figure 15:
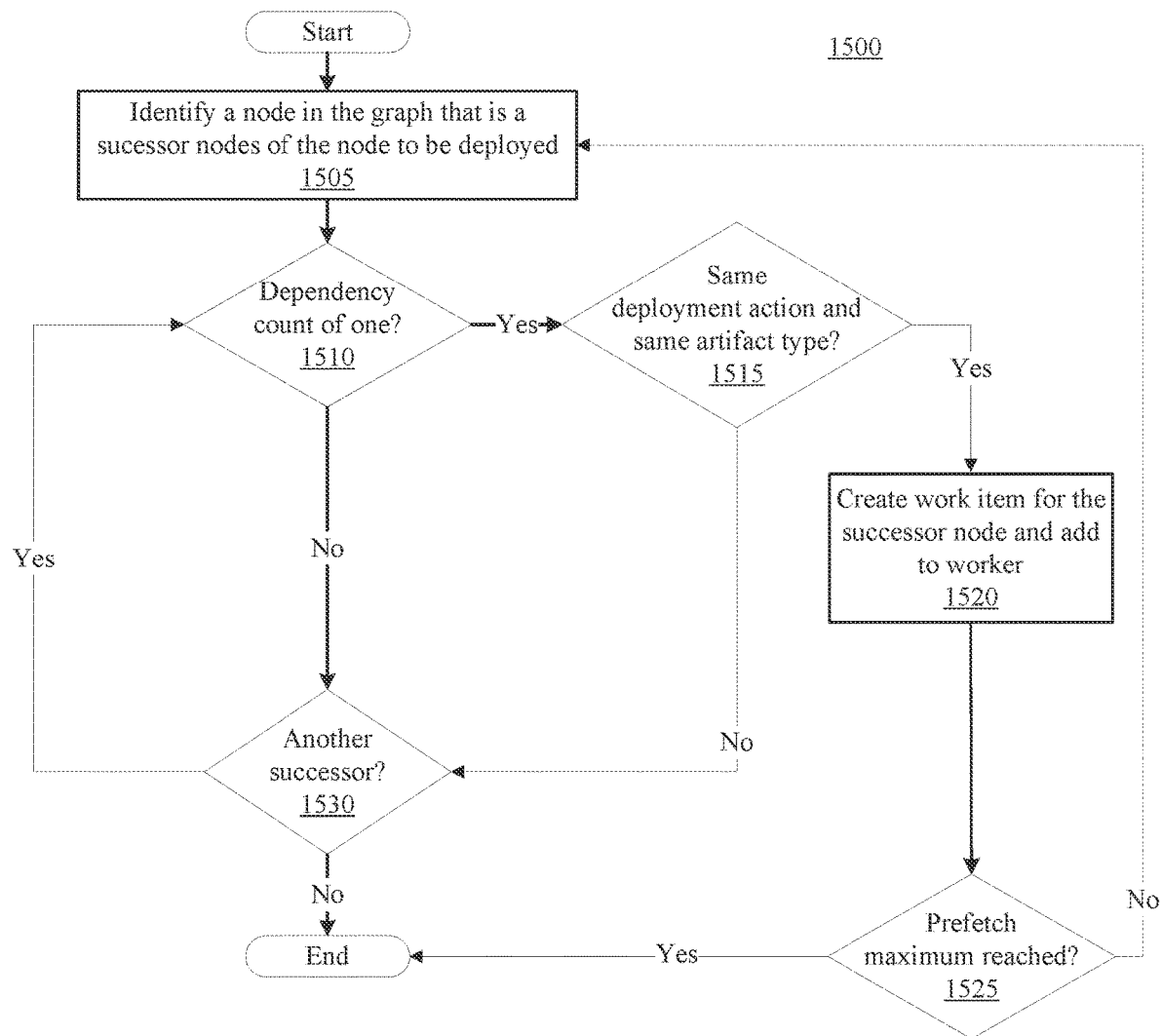
FIG. 15 illustrates a flow diagram of a prefetch process in parallelized deployment of database artifacts, consistent with disclosed implementations.

In some implementations, the system may further optimize combined node processing by prefetching nodes from the dependency graph. FIG. 15 illustrates a flow diagram of a prefetch process 1500, consistent with disclosed implementations. Process 1500 may be performed by a worker as part of step 230 of FIG. 2 after obtaining a node from the work queue and before processing (e.g., deploying) the artifact represented by the node. The node obtained from the work queue is referred to as the current node. Process 1500 begins by walking the dependency graph from the current node and identifying a successor node in the dependency graph (1505). A successor node is a direct child of the current node in the graph. The system determines whether the successor is ready for deployment after deployment of the current node by determining whether the dependency count of the successor node is one (1510). If it is not (1510, No), the successor node is waiting for a node other than the current node and cannot be pre-fetched. The system then checks for another successor of the current node (1530) in the graph. If another successor of the current node is identified (1530, Yes), the system determines whether that node has a dependency count of one (1510). This continues until there are no other successor nodes for the current node (1530, No) and process 1500 ends for the current node.

If the system does determine that a successor node has a dependency count of one (1510, Yes), the system may optionally determine whether the deployment action and artifact type are the same as the current node (1515). In implementations, the system may only pre-fetch artifacts for nodes that can be bundled with the current node, e.g., if the plug-in supports combined processing. Thus, a prerequisite for prefetching a successor node may be that all nodes have the same deployment action (e.g., undeploy, deploy, redeploy) and are for the same plugin and the plugin allows for combined processing. In such implementations, if the successor node is not of the same artifact type as the current node or is of a different deployment action (1515, No), the system may not pre-fetch the successor and may look for another successor (1530), as described above.

If the successor is of the same artifact type and deployment action (1515, Yes), the system may create a work item for the successor node and add the work item to the worker (1520). Adding the work item to the worker allows the worker to bundle the work item with the current node, if the system supports combined processing as described above. In some implementations, the system does not support combined processing (e.g., the plugin for the artifact type does not support combined processing). If combined processing is not supported, the worker may provide the artifacts serially to the plugin, e.g., as the plugin finishes deployment of a prior artifact. The system may then determine whether a prefetch maximum is reached (1525). For example, in some implementations the system may have a limit on the number of nodes that can be prefetched. This limit is optional, but if the system does have a limit and the limit has been reached (1525, Yes), the process 1500 ends for the current node. Otherwise, the system may recursively begin process 1500 with the successor as the current node (1525, No). In other words, the system may walk the dependency graph from the successor that was just pre-fetched to see if it has any successor nodes that can be prefetched.

Figure 16A:
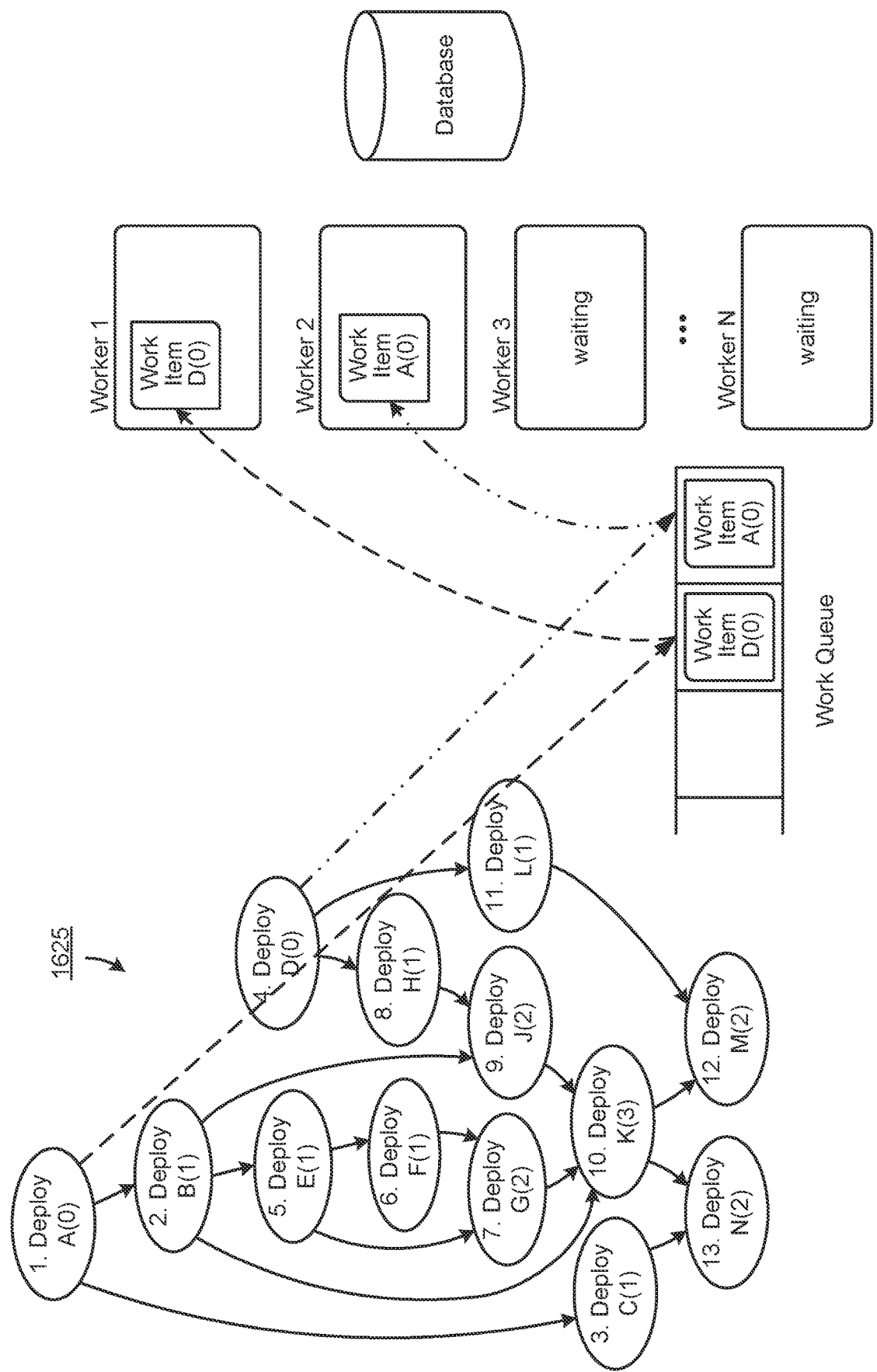
FIGS. 16A to 16C illustrate an example of prefetching nodes, consistent with this disclosure.
Figure 16B:
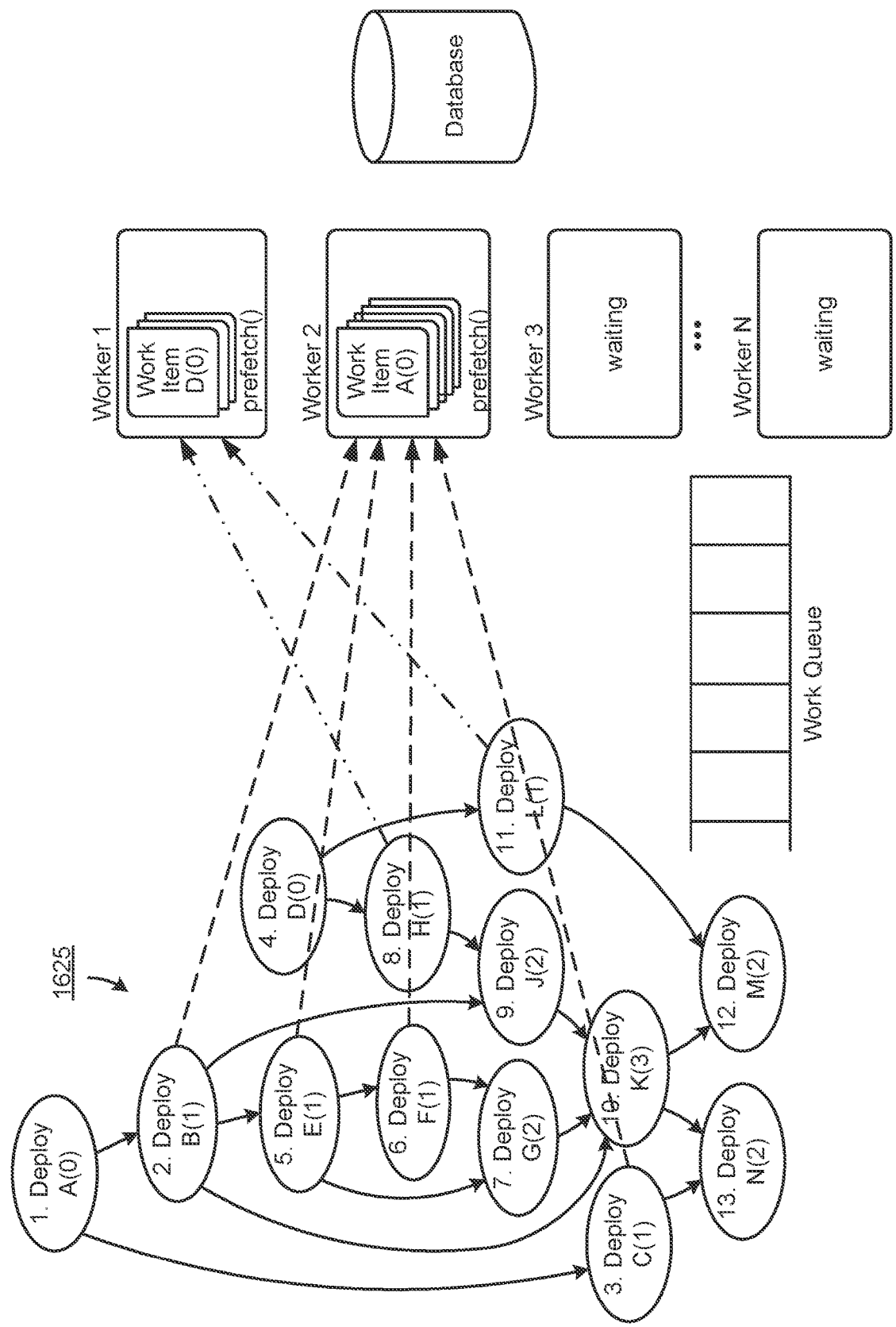
Figure 16C:
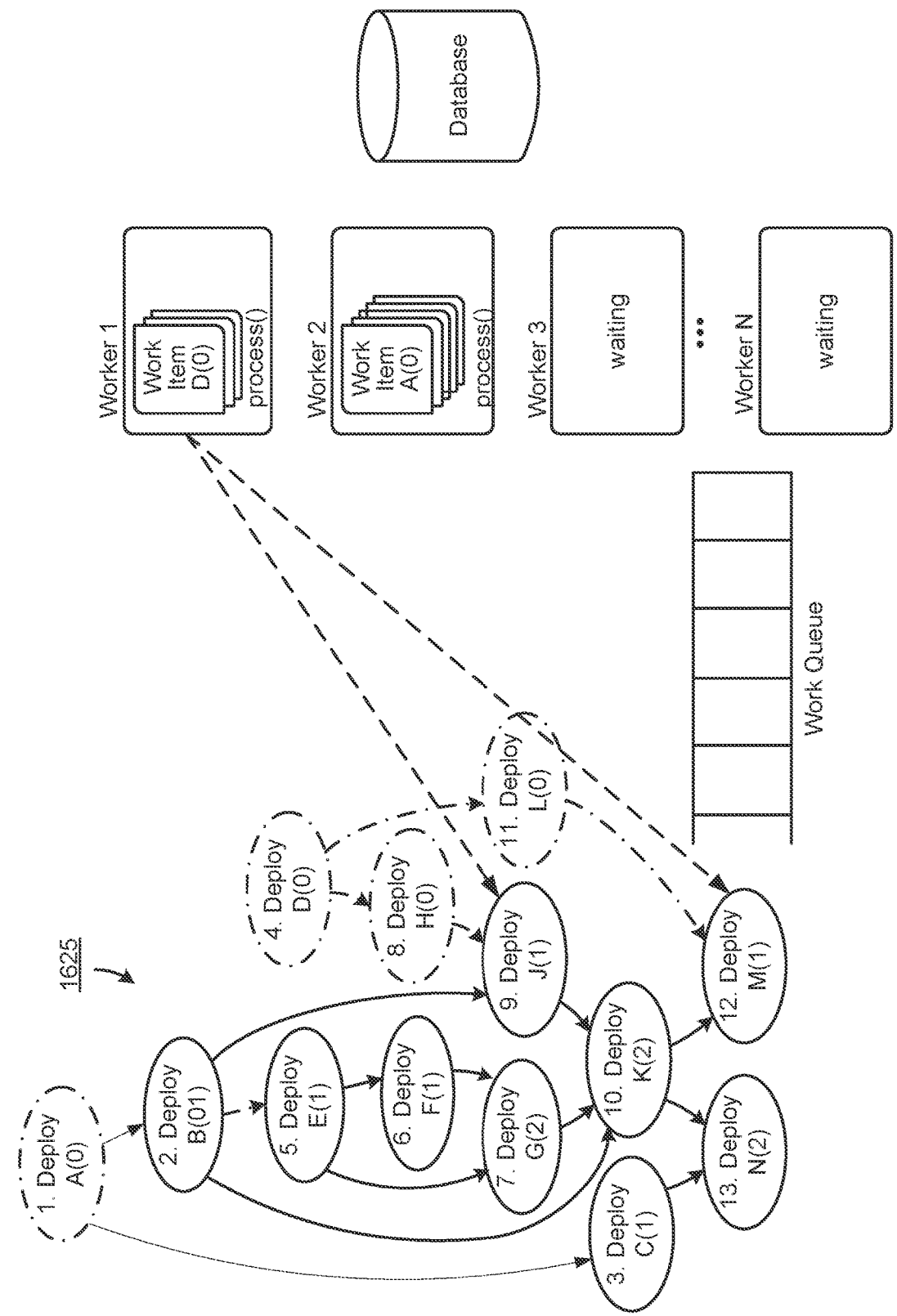

FIGS. 16A to 16C illustrate an example of prefetching nodes, consistent with disclosed implementations. The sample execution graph 1625 in FIG. 16A has a total of 13 nodes with node IDs from 1 to 13 and artifact names A, B, C, D, E, F, G, H, J, K, L, M, N. For the purposes of the example illustrated in FIGS. 16A to 16C, the artifacts are all of the same type and the nodes in the execution graph all have the same deployment action (e.g., deploy). There are two root nodes, A and D, because their dependency count is zero. Therefore, to start processing, corresponding work items for the two root nodes are put into the work queue, as illustrated in FIG. 16A. In FIG. 16A, combined processing is not used. Therefore, multiple idle (waiting) workers will fetch the work items from the work queue.

In the example execution graph 1625, nodes for artifacts B, C, E, F, H, L only have a dependency count 1. This means that they each are just waiting for deployment of one predecessor node to complete. In other words, when node 1 for artifact A has been processed, it will be the turn of nodes 2 and 3 for artifacts B and C respectively. These two nodes are only waiting for node 1 for artifact A to finish. The same is true for nodes 8 and 11 for artifacts H and L respectively, which are only waiting for node 4 for artifact D. And as soon as B has finished, it's the turn of E, and so on.

FIG. 16B illustrates that the direct successors (B, C, H, L) of the root nodes (A, D) only depend on the root nodes. Therefore, in some implementations, the system calls a prefetch( ) method that fetches the information from these graph nodes, creates a corresponding work item for each fetched node, and assigns the work items to the respective workers of the root nodes A and D. In other words, the work items for nodes 2 and 3 are assigned to worker 2 with node 1 and the work items for nodes 8 and 11 are assigned to worker 1 with node 4. The workers may then process the work items in bundles, as described above with regard to FIG. 14A and FIG. 14B, in implementations where the system supports combined processing.

In addition to direct successors of the root nodes, the system may also check successors of the direct successors. For example, because artifact B will be processed, and artifact E is only waiting for artifact B, the system can also prefetch node 5 for artifact E, which can be added to the work items in worker 2. Likewise, node 6 for artifact F waits only waiting for node 5 (artifact E), so the system can also prefetch node 6 for artifact F. The chain stops after artifact F because node 7 for artifact G has dependency count 2. The nodes prefetched from the execution graph 1625 have never been in the work queue, because they have never been ready (i.e., a dependency count of 0 has never been reached). But it is foreseeable that they will be next, and therefore they are also processed without ever appearing in the work queue.

Once the work items are prefetched, the work items are passed to the respective plugins and the plugins deploy the corresponding artifacts in the database by sending SQL requests. When setting the "combined processing" flag, a plugin declares itself capable of handling several work items and to be able to determine the correct order of work items. In the example of FIG. 16B, the plugin must of course deploy D before B and C, etc. but the plugin is capable of handling this determination when the combined processing flag is set.

FIG. 16C illustrates steps taken after the deployment of the artifacts in the database by worker 1, according to an implementation. As described above, the system decrements the backwards edge counts of the direct subordinates of the root nodes. In addition, the system decrements the dependency counts of any prefetched nodes that are not direct subordinates, although in this example there are none. However, when worker 2 finishes it will subtract one from the dependency count of nodes 2, 3, 5, and 6. All of the dependency counts of the prefetched nodes are now zero. But the nodes are not put into the work queue because the system has already deployed the artifacts. Thus, the system may track which artifacts from the execution graph are prefetched and thus already deployed.

In addition to decrementing the dependency count of the prefetched nodes, the system also decrements the dependency count of any successor nodes of the prefetched nodes, as illustrated in FIG. 16C. The system accordingly decrements the dependency count of nodes 9 and 12, which are successor nodes of node 8 and 11 respectively. No nodes yet become a root node ready for deployment, but when worker 2 finishes node 9 will be ready for deployment. In the specific example of FIG. 16C, no additional prefetching can be done because node 10 for artifact K has a dependency count of 2 and not 1. But when node K is ready for deployment and placed as a work item in the work queue, the system can prefetch node 12 for artifact M. If worker 2 has finished deploying the prefetched artifacts, the system could also prefetch node 13 for artifact N because at that point artifact C would have been deployed, node 13 would only have the dependency on node 10 remaining (e.g., the dependency count for node 13 would, by that time, be one).

After deployment of prefetched nodes, the system (e.g., workers) decrements the dependency count of each prefetched node. Thus, when worker 2 has finished deploying node 1 and all nodes prefetched with 1, the system may decrement the dependency count of node 7 (artifact G) twice because node 7 is a successor of both node 6 and of node 5, and both 6 and 5 were prefetched with node 1. Thus, node 7 for artifact G would have a dependency count of zero, and be ready for deployment as a root node. Accordingly, the system would generate a work item and put the work item into the work queue. The system continues processing as before, including prefetching and bundling where appropriate, until all artifacts represented in the execution graph 1625 have been deployed.

Parallel Connection Multiplexing

The introduction of parallelization in artifact deployment that deploys all artifacts in a container in one database transaction introduces some challenges. For example, with a non-parallelized, single-threaded execution, the system can use a single database connection to execute the deployment steps, e.g., DROP a table, CREATE a table, CREATE a view, which may be accomplished via SQL statements sent by the artifact conversion engine (e.g., a plugin) to the database.

Because everything is run on the same database connection, all steps are visible to subsequent steps, e.g., a table is created before a view will use it, even without committing the database transaction.

With parallelization, the system cannot simply switch to multiple, independent database connections, one per worker, because this would not allow the system to run all parallelized steps inside the same database transaction. In other words, in such a system each worker would be executing work in its own transaction and a rollback on one connection would not roll back work performed on the other connections. Sharing the same database connection on the deployment infrastructure client (e.g., deployment controller and/or artifact conversion engine) is not a good option, because this would require explicit locking of the connection and then only one worker could use the database connection at any point in time. This has the effect of reducing the amount of possible parallelization the system can achieve.

Another challenge introduced by multiplexing is transaction poisoning. In a single-threaded mode, everything is handled on the same connection and transaction so the system can use a client-side (e.g., deployment infrastructure 120) "transaction poisoning" mechanism that blocks any subsequent call to the database server once an error has occurred; from that point in time, the transaction is "poisoned" and useless. But with parallelization, the system cannot handle this error situation at the deployment infrastructure client.

To address these problems, the system may use client-side connection multiplexing combined with a connection state on the server. For example, when a user deploys design-time artifacts in a container, the system may start a main thread (e.g., the make( ) thread) at the deployment infrastructure client (e.g., deployment infrastructure 120). That main thread may exist until the deployment of that container is complete. The main thread may request a database connection from the database server (e.g., database 140), and the database server may open a connection. The database server opens a real physical database connection and passes a logical connection identifier back to the client's main thread. When the make process starts the workers, the make process may share the identifier with the workers. Thus, each worker associated with the deployment of the container shares the same physical connection to the database, rather than each worker opening a new database connection. In other words, the system multiplexes the single database connection.

Figure 17:
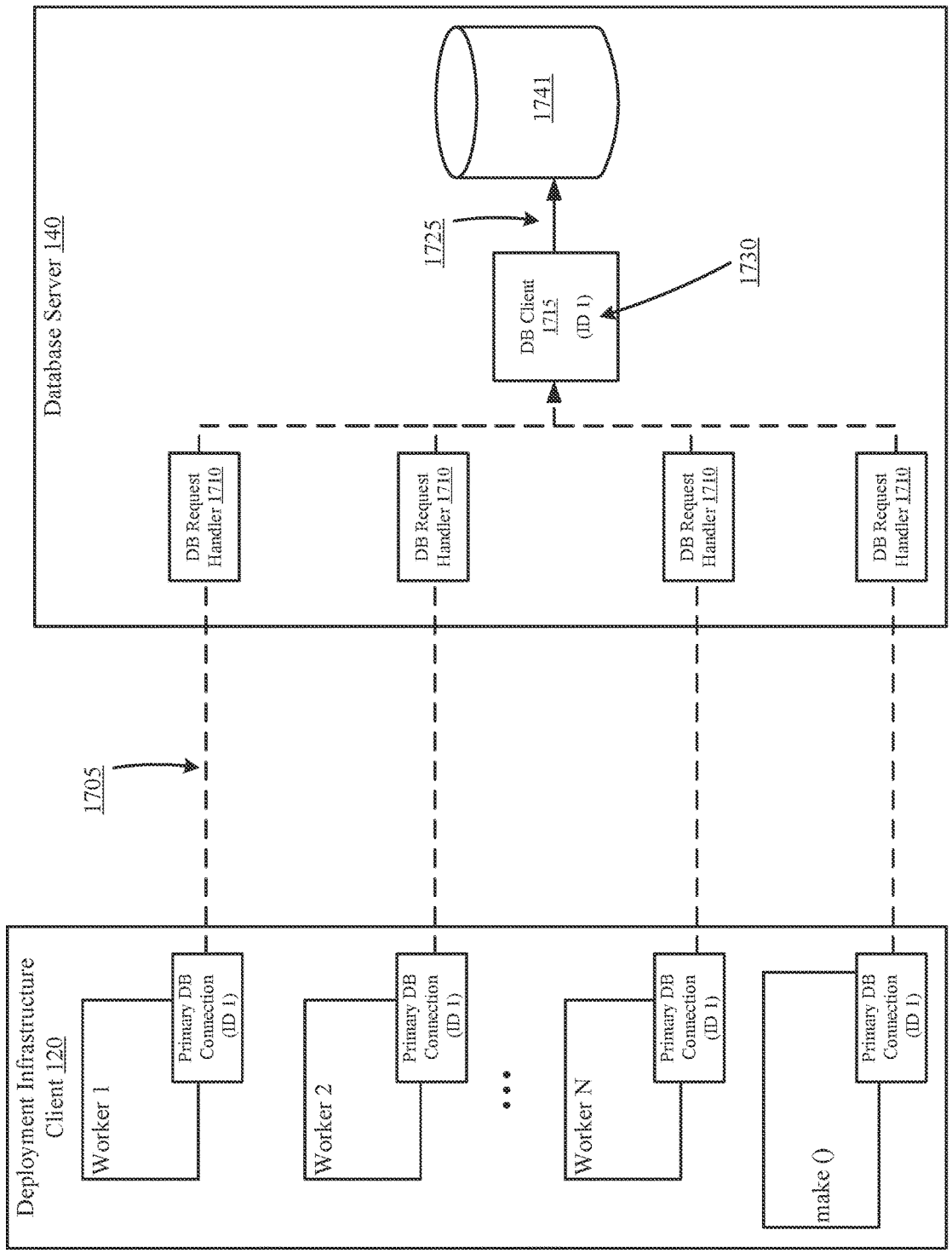
FIG. 17 is a block diagram illustrating an example of connection multiplexing, consistent with this disclosure.

FIG. 17 is a block diagram illustrating a deployment infrastructure client 120 that uses a multiplexed database connection. In the example of FIG. 17, the logical connection 1705 is represented as dashed lines. These multiplexed connections are not real physical database connections. Instead, they are only lightweight, client-side proxies for a physical database connection 1725 that is kept on the server-side. The server 140 keeps the connection state of the real physical database connection 1725 in a connection state table. This connection identifier may also be referred to as a transaction identifier, because any commands issued via this connection falls within the same transaction. When a worker (or the main thread) on the client 120 talks to the server 140 (e.g., issues SQL commands for the database 1741, or other similar commands), it will send a request that includes the logical connection id 1730, e.g., ID 1, to the server 140. When the server 140 receives the request it may generate a DB Request Handler 1710 process. The DB Request Handler 1710 exists only until the request is handled by a DB Client 1715 and a response is sent back to the worker that made the request. The DB Request Handler 1710 handling a request receives the request and the connection id and uses the connection id from the request to identify the corresponding database connection from the connection state table. The DB Request Handler 1710 then provides the request to the appropriate DB Client 1715, e.g., the database client that corresponds to the connection identifier (e.g., ID 1). The DB Client 1715 then handles execution of the requested operation (e.g. a CREATE statement, a SELECT statement, etc.) against the database 1741 and sends the result back to the corresponding DB Request Handler 1710, which passes the response to the corresponding worker on the client 120.

With the workers all using the same logical connection identifier (e.g., ID 1), the system may implement transaction poisoning on the database server 140. The DB Client 1715 in general processes the requests received from the various DB Request Handlers 1710 in a first-in-first-out order. If a particular operation fails, the DB Client 1715 knows about the error and can prevent subsequent operations on the same connection from proceeding. For example, the DB Client 1715 may immediately send a response message that indicates the request failed for any requests waiting in its connection queue. In some implementations, the DB Client 1715 may also set a flag so that it knows to reject any additional requests received as failed. Additional requests may continue to come to the DB Client 1715 from workers that have not been notified of the failure. In this manner, once any operation fails, the server 140 can identify and stop requests already sent to the server 140 but not yet processed by the server 140, as well as reject any additional received requests, for that connection. This is not possible with client-side transaction poisoning.

A benefit of connection multiplexing on the deployment infrastructure client 120 is that the workers can hide network latencies of the client-to-server communication. For example, there is some amount of time consumed by sending a request from the client 120 to the server 140 and sending a response from the server 140 to the client 120. In serial processing, the DB Client 1715 on the server 140 is idle and not performing any operations against the database 1741 during that time. But with connection multiplexing, the DB Client 1715 has a queue of work items that it can process while a response is sent back to another worker. This queue may be referred to as a connection queue because it is associated with the specific database connection. The ability to interleave work from different workers that arrives at different times minimizes the down time of the DB Client 1715 due to network latencies. Thus, connection multiplexing improves the functioning of the database server 140.

Figure 18:
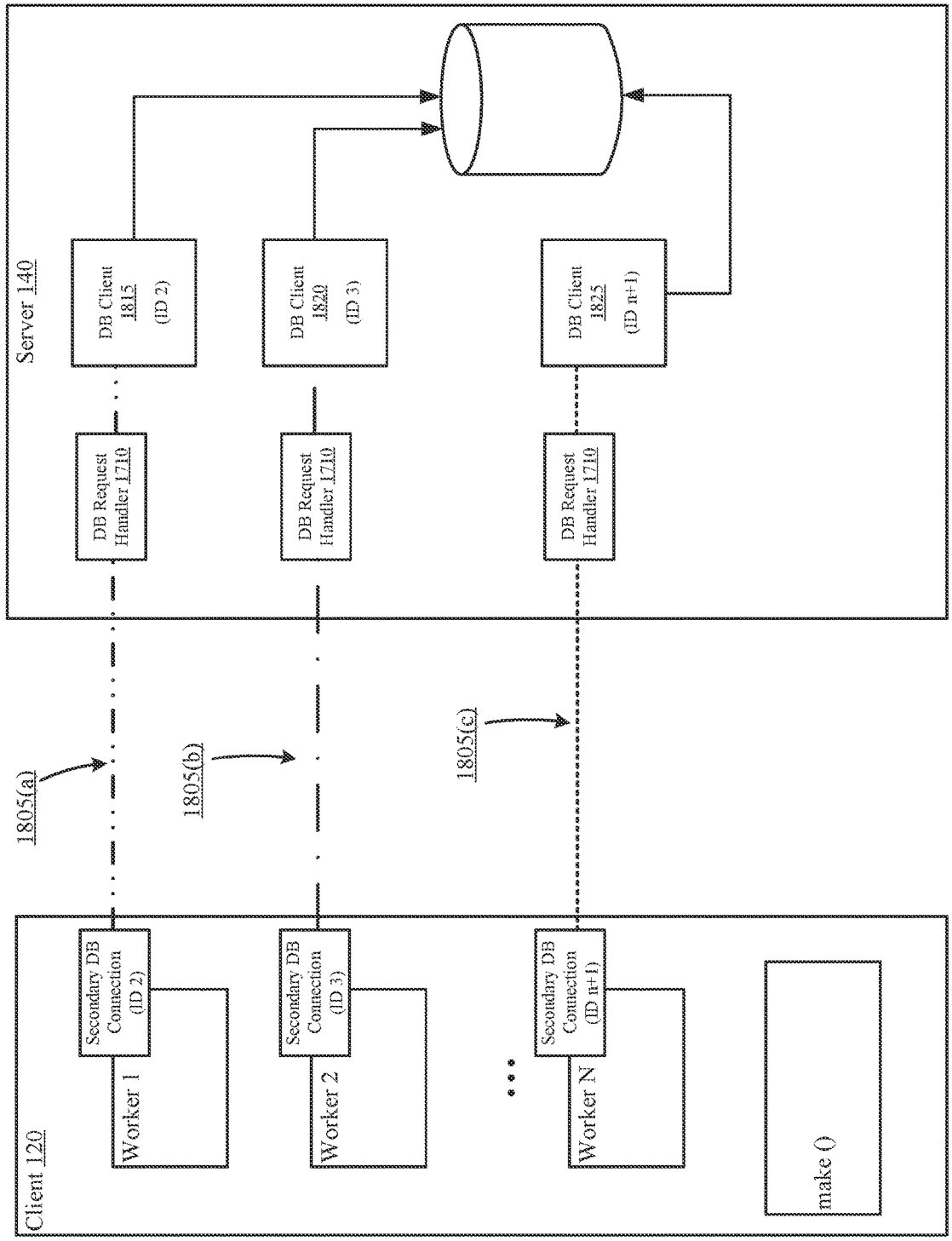
FIG. 18 is a block diagram illustrating an example of workers with unique secondary database connections, consistent with this disclosure.
Figure 19:
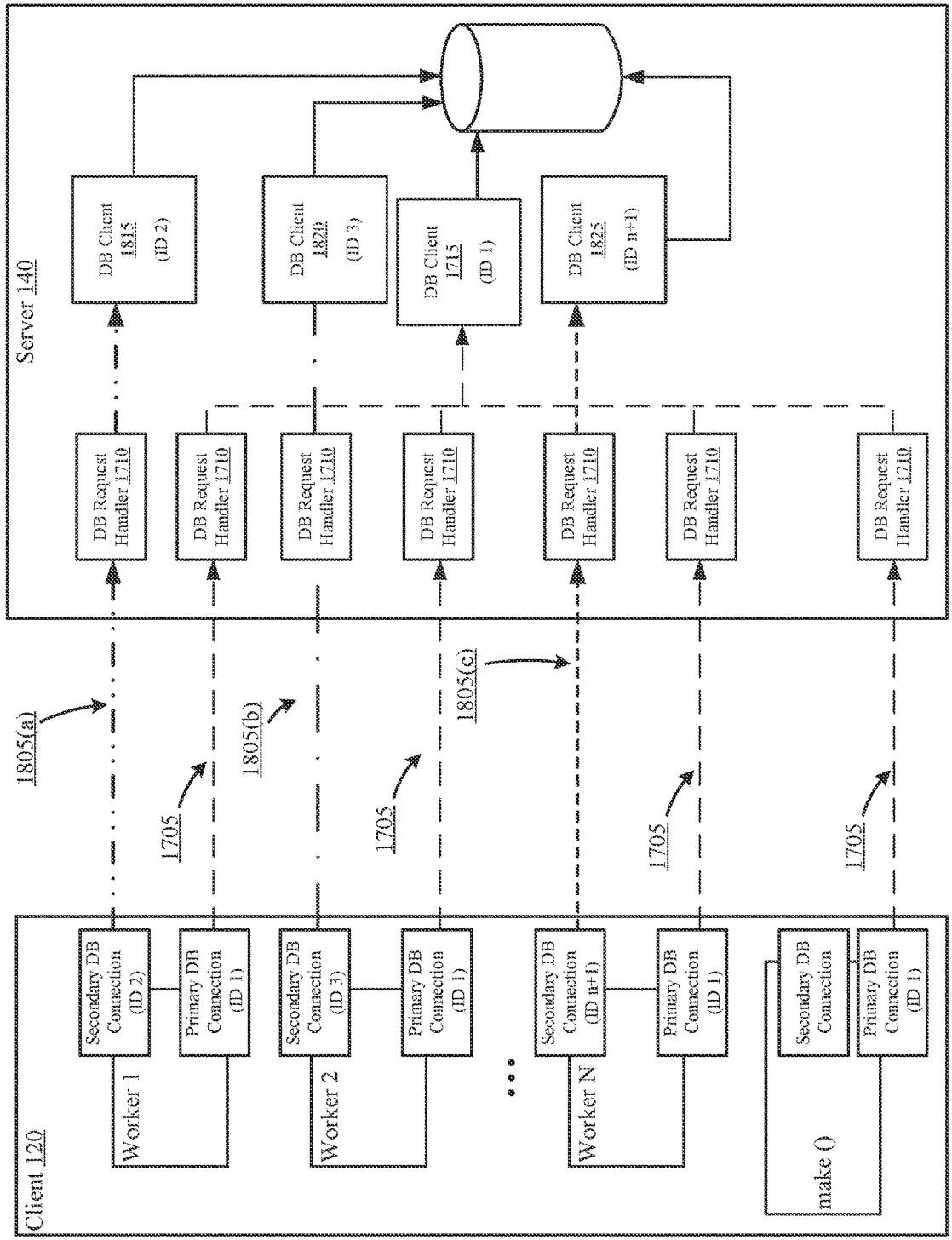
FIG. 19 is a block diagram illustrating an example system that uses connection multiplexing of a primary database connection and a secondary database connection unique to each worker, consistent with this disclosure.

In some implementations, the system may equip the workers with an additional, secondary physical database connection that is unique to each worker. FIG. 18 is a block diagram that illustrates a system in which each worker has a corresponding secondary database connection. For example, in FIG. 18 each secondary connection is illustrated as a dotted or dotted-and-dashed lines. The secondary database connections, e.g., 1805(a), 1805(b), 1805(c) are separate connection from the primary connection. In other words, any database requests handled using a secondary DB connection will not be in the same transaction and the database requests handled using the primary DB connection. With a secondary database connection, the system can offload some of the operations from the primary multiplexed connection to this secondary connection when the operation does not have to run inside the same transaction. For example, the work initiated by Worker 1 may include writing records to a log table at the server 140. These log records do not need to run in the same transaction as they are not database objects deployed from artifacts in the container. Similarly, the work initiated by Worker 1 may include writing the artifact file for backup purposes, which also does not need to be part of the transaction. Any work item that does not change the state of the database to which artifacts are being deployed can be handled by a secondary connection. The worker may request the secondary connection when it is started by the main thread. Thus, in some implementations, each worker has two connections: the primary, multiplexed connection and its own secondary connection, as illustrated in the block diagram of FIG. 19. FIG. 19 illustrates the combination of FIG. 17 and FIG. 18, which enables work representing deployment activities for a database object in a container to be performed on a primary logical connection (e.g., ID 1) and other database activities to be performed on a secondary connection unique to each worker (e.g., ID 2 through ID n+1).

Figure 20:
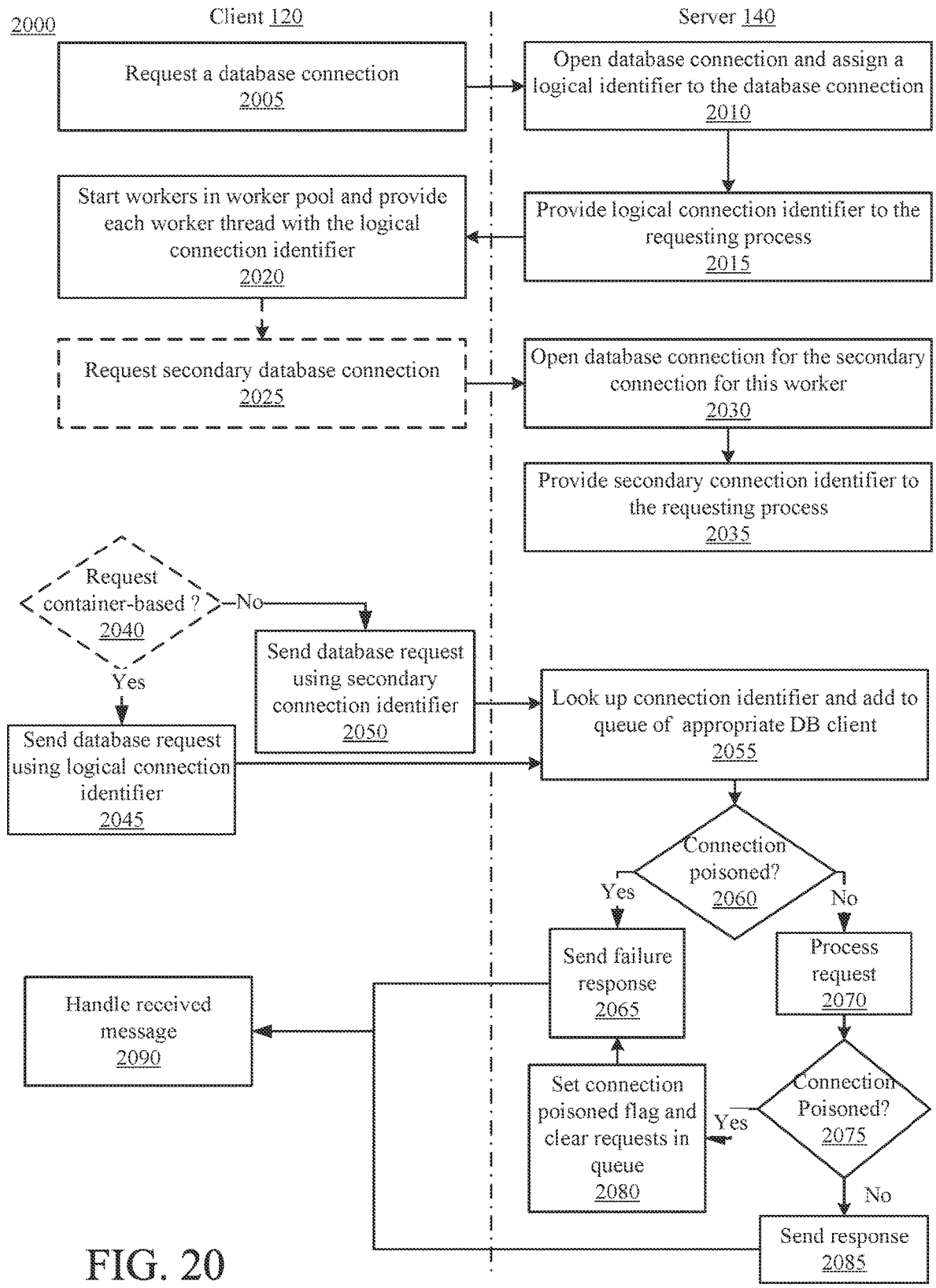
FIG. 20 is a flowchart illustrating an example multiplexing process, consistent with this disclosure.

FIG. 20 is a flowchart illustrating an example multiplexing process 2000, consistent with this disclosure. The process 2000 illustrates the use of optional secondary database connections for the workers. Process 2000 is described with respect to deployment of database artifacts, but can be used in any processing environment where multiple database operations are intended to be performed in a single transaction in a parallel manner, e.g., by multiple workers. Thus, implementations are not limited to deployment of database artifacts. Process 2000 may be executed partially by a client, e.g., deployment infrastructure client 120, and partially by the database server 140. Process 2000 may be triggered by a deployment request for a container. It is understood that a system may handle multiple deployment requests for multiple containers at one time. Thus, for example, process 2000 may be running for a first container concurrently with a second container. The database server 140 is capable of tracking which database connections belong with which deployment process.

Process 2000 begins with a main thread requesting a database connection from the server 140 (2005). The database connection requested is a primary connection that will be used to process all database requests for the container in one transaction. The server 140 receives the request and opens a database connection and assigns the connection a logical identifier (2010). The server 140 may track which physical database connection this logical identifier belongs to. In some implementations, this logical connection may also be tied to an identifier for the deployment request (e.g., the make( ) process). For example, as described below, the database may include a status table that tracks which deployment request has which logical connection, as well as whether that connection is active or not. In such implementations, when the system opens the database connection it may write an entry into this status table.

The server 140 may provide the logical connection identifier to the requesting process, e.g., the main thread for the container being deployed (2015). The main thread may start a worker pool and set up a work queue for the workers (2020). The main thread may also share the logical connection identifier with each of the workers. Thus, each worker has the logical connection identifier to be used for making requests to the database. In some implementations, each worker, as part of its initialization process, may request a secondary database connection (2025). The worker may use its secondary database connection for database requests that do not affect the database schema that is the subject of the deployment. For example, the secondary database connection may be used to write log messages or to write copies of files (e.g., the artifact file used to generate the database objects). The server 140 receives the request and opens a secondary connection for this worker (2030). The server 140 may receive a request from each worker and open a separate secondary database connection for each worker. The server 140 may provide the secondary connection identifier (whether a logical or physical connection identifier) to the worker thread (2035). The server 140 need not to track which deployment request a secondary connection belongs to as it is not part of the transaction in which database objects are deployed. If this secondary connection fails during the deployment process, in some implementations, the worker will just request another connection.

Process 2000 will be idle until a worker is ready to send a request to the database. As discussed above, an artifact conversion engine, such as a plugin for an artifact type, may be responsible for determining the content of the database request (e.g., an SQL ALTER, DELETE, ADD, UPDATE, etc. statement). When the plugin is ready to send a request, the request is sent via the worker thread to the server. If the worker has a secondary connection, the worker may first determine whether the request is container-based (2040). A request is container-based when it includes statements relating to database objects being deployed that need to be part of a single transaction for the container. A request is not container-based when it is a write to a log file or some other transaction that does not need to be part of the single transaction. If the request is not container-based (2040, No), the worker sends the database request using the secondary connection identifier (2050). If the request is container-based (2040, Yes) or if the worker does not have a secondary connection the worker sends the request with the logical connection identifier (2045).

The server 140 receives the request, uses the connection identifier to determine an appropriate DB client, and sends the request to the appropriate DB client, e.g., one of DB clients 1715, 1815, 1820, and 1825 of FIG. 19) (2055). In some implementations, this may be done by a DB request handler spawned when the request is received. This DB request handler may stay active until a response is provided to the requesting worker. In some implementations, this may be done by some other database process, which may or may not exist beyond sending the response to the worker. The server 140 may determine whether the connection associated with the request is poisoned (2060). A connection is poisoned when a database request made using the connection was not successful, e.g., could not be successfully completed. This may occur because of a database error (e.g., syntax error, connection error, etc.) or because of a security error (e.g., container owner does not have access rights to a database object identified in the request). Once one request is not successful, the remaining requests in the transaction are "poisoned" and should not be attempted. In some implementations, step 2060 may be performed by a DB request handler that may check a flag associated with the connection identifier prior to sending the request to the DB client. In some implementations, the DB client may determine whether the connection is poisoned (2060) before adding the request to its connection queue. If the connection is poisoned (2060, Yes), the system may send a failure response to the requesting worker (2065). Thus, the server 140 is able to immediately reject the transaction. The requesting worker is capable of handling the received message (2090) in an appropriate manner. For example, if the message is a failure on a primary connection, the worker may stop processing work items and may close, as no additional work items for this transaction can be processed. If the message is a failure on a secondary connection, the worker may request another secondary connection.

If the connection is not poisoned, the request may be put on the connection queue for the connection identified in the request and, at some point, may be processed (2070). Processing the request means the database statements of the request are executed and result in changes to the database. If the request was successfully processed, the connection is not poisoned (2075, No) and the server 140 sends a response back to the requesting worker (2085). The worker handles the request (2090), e.g., moving on to another work item in its queue. If the request was not successful, the connection has become poisoned (2075, No). Accordingly, the system may set a connection poisoned flag to "true", send a failure response back to the requesting worker (2065) and clear any requests remaining in the connection queue for this DB client. Clearing the remaining requests includes sending a failure response back to the requesting workers (2065). Thus, although a request may have been placed in the queue to await processing (2070), it can be removed from the queue as part of step 2080 and a failure message returned to the requesting worker.

Process 2000 continues until all workers have ended, meaning that the make( ) process (deployment request) has completed. Once the make( ) process for this container is completed, the main thread may release the primary database connection. In some implementations, this may include updating a row in a status table for the make( ) process indicating the connection in no longer active. In some implementations, a result of the make( ) (e.g., successful or failed) may also be written to the table.

Automatic Status Detection

To simplify the handling of potentially long-running processes, the system can start such processes, e.g., deployments of database artifacts, asynchronously. Asynchronous deployment enables the developer to use the development environment client for other tasks while the deployment process runs. In other words, the user does not need to be idle while waiting for the outcome of the deployment. One challenge for the development client in this situation is determining whether or not the deployment process has finished. An approach of writing messages into a logging table only works as long as the deployment terminates normally. If the status message indicating the deployment is finished never makes it into the logging table, e.g., due to unexpected situations such as a crash of the deployment infrastructure or the database, a client polling the status will potentially never return from the polling loop and the development client will never see the deployment as completed.

To mitigate this problem, some implementations may include a status detection process. For example, when the deployment infrastructure system receives a deployment request, it may provide an identifier to the requesting development client that the client can use to query the status of the asynchronous deployment's connection. The status detection process may ensure that as long as the asynchronous deployment is active, the deployment's connection will be active. If for any reason the deployment terminates, its connection status will be set to inactive. In the disclosed connection status process, the connection status is set either by the database or the deployment infrastructure and does not depend on the specific way the deployment terminated.

To facilitate the connection status process, the initial call to the asynchronous deployment saves the connection information (connection ID and connection start time) in a status table, e.g., a database table for tracking the deployment. This may be a table that also tracks the status of other concurrent deployment requests. The deployment infrastructure may use the same connection to execute the deployment tasks and may pass the connection identifier to the requesting client. The development client does not close the connection, but leaves it open so the deployment infrastructure can use it for its operations while the development client performs other tasks. The development client can use the connection identifier to reliably determine if a deployment is still running or has terminated for any reason. In some implementations, the development client may poll the status on a periodic basis. In some implementations, the development client may poll the status at the request of the user.

Figure 21:
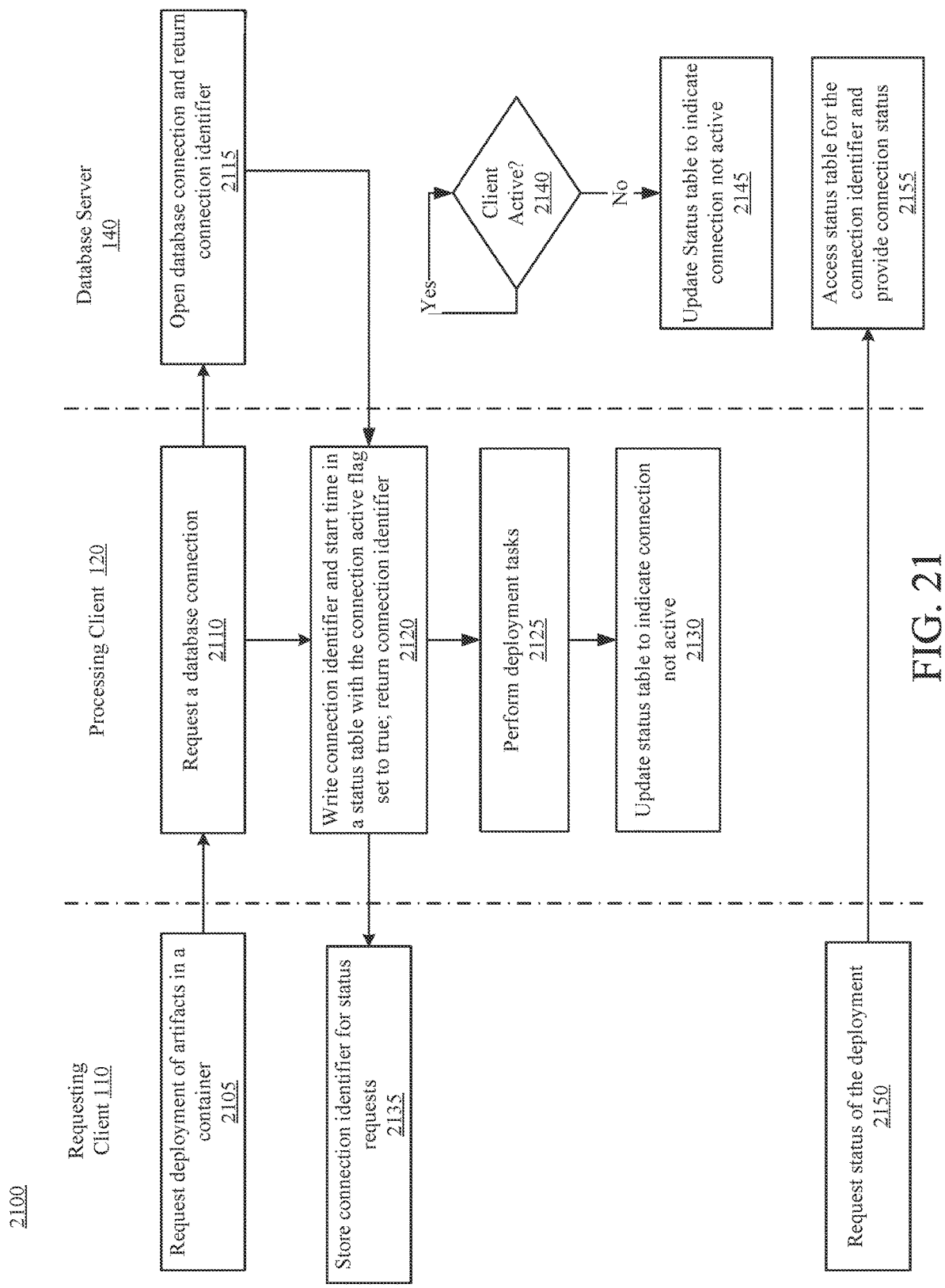
FIG. 21 is a flowchart of an example process supporting status detection of a deployment process in an asynchronous deployment, consistent with this disclosure.

FIG. 21 illustrates an example flowchart of a process 2100 supporting status detection of a deployment process in an asynchronous deployment, consistent with this disclosure. Process 2100 may be implemented by a deployment infrastructure system such as system 100 of FIG. 1. While process 2100 is described with respect to deployment of artifacts, it is understood that process 2100 may work for any asynchronous process where a requesting client (e.g., client 110) needs to have the ability to determine the outcome of a complex procedure with multiple database calls.

Process 2100 begins when a requesting client, such as development environment client 110 of FIG. 1, requests deployment of artifacts in a container (2105), as discussed herein. Of course, the request could be for another process that includes multiple database requests performed in a single transaction. The request is handled by the processing client 120, such as deployment infrastructure client 120 of FIG. 1, which requests a database connection for this process (2110), e.g., the deployment request. The processing client 120 requests a single connection so that all requests occurring within the deployment process can be in a single transaction. The connection request is received by the database server 140, which opens the connection and returns a connection identifier (2115). Step 2115 may be similar to steps 2010 and 2015 of FIG. 20 in a parallelized deployment infrastructure environment.

In some implementations, when the processing client 120 receives the connection identifier, which may be a logical or a physical connection identifier, the client 120 writes the connection identifier and a start time in a status table (2120). The status table may include a row for each active process, e.g., each deployment request. In some implementations, the client 120 may also set the connection active flag to true, indicating that the process is still active and has not completed. In some implementations the presence of the row in the status table indicates the connection is active. In some implementations, the row may be written to the status table at the database server 140, e.g., when the database connection is opened. The client 120 may return the connection identifier to the requesting client 110. The requesting client 110 may track the connection identifier, e.g., stored in a memory, to be used in subsequent status requests (2135). At this point, the requesting client 110 is free to perform other tasks and is not tied up waiting for the outcome of the deployment request. Thus, the processing request is asynchronous.

The client 120 may, after returning the connection identifier to the requesting client 110, begin performing the deployment tasks (2125). These tasks are described above, e.g., building a dependency graph and deploying the artifacts as database objects. The deployment tasks may use parallel processing, as described above, or may be serial. Of course, the tasks performed may not be deployment tasks, but could be some other series of tasks that invoke multiple database operations. After some period of time, the client 120 may complete the deployment tasks and update the status table for the connection identifier to indicate that the connection is no longer active (2130), e.g., setting the connection active flag to false or removing the row, etc. The false status does not indicate whether the deployment tasks were successful, only that the deployment process finished. In some implementations, the client 120 may include an outcome of the process, e.g., whether it was successful or not, in the status table.

If for some reason the client 120 crashes during step 2125 it may never perform step 2130. To account for this, the database server 140 may include a process (e.g., proxy engine 144 of FIG. 1) that occasionally polls the client 120 to determine if the client 120 is still active (2140). If the database server 140 finds the client 120 still active (2140, Yes), it may take no action, as the client 120 is assumed to be functioning normally and will attend to updating the status table appropriately. However, if the client is found not to be active (2140, No), the database server 140 may update the status table for the connection (e.g., any open connections for client 120) to indicate that the connection is no longer active (2145). This may include setting a value of a connection active flag, removing a row in the status table for the connection, etc. In some implementations, the database server 140 may also add an outcome to the status table, indicating the process did not end successfully.

At any time after receiving the connection identifier, the requesting client 110 may request the status of the deployment process (2150) using the connection identifier. Thus it is understood that steps 2150 and 2155 may occur independently of the performance of the deployment tasks 2125. When the database server 140 receives the request (which may or may not be passed to the database server 140 via the processing client 120), it may access the status table using the connection identifier and return status of the connection (e.g., the value of the connection active flag or presence/absence of an entry for the connection in the table) (2155) to the requesting client 110. In some implementations, the server 140 may also return the outcome, e.g., if the status table includes the outcome and the connection active flag is false. The user of the requesting client 110 can decide what action to take based on the status of the connection and the outcome (if provided). Of course the connection active flag may have various values representing the status, such as true/false, "active"/"inactive" "A"/"I", etc. In some implementations, the table does not include a connection active flag but only the connection id and, optionally, the start time. The status (active/inactive) can then be determined based on the presence or absence of a matching row in the table. In some implementations, the status may be determined via database monitoring system views, which access the status of connections. If the connection with the id and start time is shown as active, then the deployment is still ongoing. If the connection is not shown as active anymore, then the deployment is finished or the process has crashed. Process 2100 illustrates how a requesting client 110 can be sure to always be able to determine when a processing request has finished, and optionally the outcome of the request, in an asynchronous environment.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

According to one aspect, a system includes at least one memory including instructions on a computing device; and at least one processor on the computing device, wherein the processor is operably coupled to the at least one memory and is arranged and configured to execute the instructions. The instructions, when executed, cause the processor to implement an artifact conversion engine capable of deploying a plurality of artifacts to a database, each artifact having an associated artifact type, a worker pool and a work queue from which workers in the worker pool obtain work items, and a deployment controller. The deployment controller is capable of determining, on an ongoing basis, one or more root nodes in a dependency graph, the dependency graph including a node for each of the plurality of artifacts, each node having a respective dependency count, the one or more root nodes having a respective dependency count of zero, and generating a work item for each of the one or more root nodes, the work item for the one or more root nodes being placed in the work queue. Each of the workers of the worker pool are capable of obtaining a work item from the work queue, the work item representing a particular root node, initiating deployment of the artifact represented by the work item, and reducing by one the dependency count of nodes in the dependency graph that are successor nodes of the root node.

These and other aspects can include one or more of the following features, alone or in combination. For example, the plurality of artifacts may be associated with a container and the worker pool is generated for the container. As another example, each worker in the worker pool may be further capable of reducing by one a total number of items to be deployed after initiating deployment of the artifact represented by the work item. As another example, each worker in the worker pool may be further capable of determining, after initiating deployment of the artifact represented by the work item, whether a total number of items to be deployed has reached zero and terminating itself when the total number of items to be deployed has reached zero.

As another example, each work item in the work queue may have an associated artifact type and each worker in the worker pool is further capable of determining, after obtaining the work item from the work queue, whether the work queue includes an additional work item having the same artifact type as the work item, obtaining, when the work queue has an additional work item with the same artifact type, the additional work item from the work queue, and deploying the work item and the additional work item in a manner that reduces a quantity of calls made to the database.

As another example, each work item in the work queue may have an associated action and an associated artifact type and each worker in the worker pool is further capable of determining, after obtaining the work item from the work queue, whether the work queue includes an additional work item having the same artifact type and the same action as the work item, when the work queues has an additional work item with the same artifact type and the same action, obtaining the additional work item from the work queue, and deploying the work item and the additional work item in a manner that reduces a quantity of calls made to the database. In some such implementations, the artifact conversion engine can include a plugin for each artifact type, the plugin capable of deploying artifacts of a particular artifact type to the database, wherein each plugin includes a combined processing flag indicating whether work items can be bundled and determining whether the work queue includes an additional work item is performed when a plugin for the artifact type has a combined processing flag that indicates work items can be bundled.

As another example, each worker in the worker pool may be further capable of identifying a direct successor node of the root node that has a dependency count of one, generating a work item for the direct successor node, initiating deployment of the artifact represented by the work item for the direct successor node, and reducing by one the dependency count of nodes in the dependency graph that are successor nodes of the direct successor node, wherein the work item for the direct successor node is never placed in the work queue. In some implementations, the identifying, generating, initiating, and reducing are iterated for each direct successor node that has a dependence count of one, the direct successor node being considered a root node for the iteration. In some implementations, each node in the dependency graph may have an associated action and an associated artifact type and the artifact conversion engine includes a plugin for each artifact type, the plugin capable of deploying artifacts of a particular artifact type to the database, and wherein identifying a direct successor node includes determining that the direct successor node is associated with the same artifact type and the same action as the root node. The artifact conversion engine may also be further capable of deploying the work item for the root node and the work item for the successor node in a manner that reduces a quantity of calls made to the database.

In one aspect, a computer-implemented method for deployment of a plurality of artifacts to a database includes determining one or more root nodes in a dependency graph, the dependency graph including a node for each of the plurality of artifacts, each node in the graph being associated with an artifact of the plurality of artifacts and having a respective dependency count, wherein the one or more root nodes have a respective dependency count of zero, and generating a work item for each of the one or more root nodes, the work item for the one or more root nodes being placed in a work queue. In such a method, a plurality of workers can pop work items off the work queue in parallel and initiate deployment of the artifacts represented by the work items. Also in such a method, each worker of the plurality of workers reduces by one the dependency count of nodes in the dependency graph that are successor nodes of the root node deployed using the worker.

These and other aspects can include one or more of the following features, alone or in combination. For example, the plurality of workers may share a single physical database connection. As another example, each worker of the plurality of workers may also reduce by one a total number of items to be deployed after initiating deployment of the artifact. As another example, after a worker of the plurality of workers pops a first work item off the work queue, the worker also determines whether the work queue includes a second work item having a same artifact type and a same action as the first work item, and when the work queue includes the second work item pops the second work item off the work queue and combines deployment of the artifact represented by the second work item with deployment of the artifact represented by the first work item. In some implementations, the combined deployment occurs with a reduced number of database roundtrips compared with separate deployment of the first work item and the second work item.

As another example, after a worker of the plurality of workers pops a first work item off the work queue, the first work item being associated with a first root node, the worker may also identify in the dependency graph a successor node of the first root node, the successor node having a dependency count of one, generate a second work item for the successor node, and initiate deployment of the second work item. In some implementations, the first work item and the second work, item are for a same artifact type and the worker combines deployment of the artifact represented by the second work item with deployment of the artifact represented by the first work item.

In one aspect, a computer program product for ordering deployment of artifacts to a database is tangibly embodied on a non-transitory computer-readable storage medium and includes instructions that, when executed, are configured to cause at least one computing device to perform operations. The operations can include identifying one or more root nodes in a dependency graph, the dependency graph including a node for each of a plurality of artifacts to be deployed to the database, each node in the graph being associated with an artifact of the plurality of artifacts and having a respective dependency count, wherein the one or more root nodes have a respective dependency count of zero and generating a work item for each of the one or more root nodes, the work item for the one or more root nodes being placed in a work queue. As part of the operations, a plurality of workers pop work items off the work queue in parallel and initiate deployment of the artifacts represented by the work items and each worker of the plurality of workers reduces by one the dependency count of nodes in the dependency graph that are successor nodes of the root node deployed using the worker.

These and other aspects can include one or more of the following features, alone or in combination. For example, the operations may also include starting, in response to a request to deploy a plurality of artifacts, the plurality of workers being associated with the work queue, and terminating idle workers after a work item for each of the nodes in the dependency graph has been obtained from the work queue. As another example, the operations may also include generating the dependency graph using an expand phase, a precomplie phase, a merge phase, and a build graph phase, wherein at each phase the workers perform tasks for the phase in parallel.

In one aspect, a system includes at least one memory including instructions on a computing device and at least one processor on the computing device, wherein the processor is operably coupled to the at least one memory and is arranged and configured to execute the instructions that, when executed, cause the processor to implement a worker pool having a plurality of workers and a work queue from which the plurality of worker obtain work items and a process controller. The process controller is capable of requesting, responsive to a request to perform multiple database operations in a single transaction, a connection identifier for a connection to the database and providing the connection identifier to each of the plurality of workers. Each of the workers of the worker pool are capable of obtaining a work item from the work queue, initiating a database request from the work item, the database request including the connection identifier, and providing the database request to a database server. The database server is capable of determining a physical connection that corresponds to the connection identifier, and adding the request to a connection queue for a database client associated with the physical connection, the database client executing requests from the connection queue against the database via the physical connection.

These and other aspects may include one or more of the following features, alone or in combination. For example, the process controller may further be capable of requesting termination of the connection using the connection identifier after the multiple database operations have been executed. As another example, the multiple database operations may represent operations for deployment of a plurality of artifacts to the database.

As another example, the connection to the database is a first connection and at least some of the workers of the worker pool are further capable of requesting a secondary connection identifier, the secondary connection identifier corresponding to a second connection to the database, the second connection differing from the first connection and initiating a database request including the second connection identifier for a database operation that is not one of the multiple database operations in the single transaction. In some implementations, the database operation that is not one of the multiple database operations is a write to a log record in the database. In some implementations, the database operation that is not one of the multiple database operations is unaffected by a rollback of the multiple database operations.

As another example, the database client is further capable of determining that one of the multiple database operations failed, setting a connection poisoned flag for the connection identifier, and cancelling any requests in the connection queue with an operation failed response. In some implementations, the database client may also be further capable of determining that the connection poisoned flag is set and rejecting addition of subsequent requests to the connection queue.

In one aspect, a method includes requesting, responsive to a request to perform multiple database operations in a single transaction, a connection identifier for a physical connection to the database, providing the connection identifier to each of a plurality of workers, and performing the multiple database operations using the plurality of workers. Performing the multiple database operations using the plurality of workers may be accomplished by obtaining a work item from a work queue, initiating a database request for the work item, the database request representing one of the multiple database operations and including the connection identifier, and providing the database request to a database server. The database server may determine that the connection identifier corresponds to the physical connection and add the request to a connection queue associated with the physical connection, the database server executing requests from the connection queue against the database via the physical connection.

These and other aspects can include one or more of the following features, alone or in combination. For example, the method may further include requesting termination of the physical connection using the connection identifier after the multiple database operations have been executed. As another example, the plurality of workers may terminate when the multiple database operations have been executed. As another example, the connection to the database may be a first connection and at least some of the plurality of workers are further capable of requesting a secondary connection identifier, the secondary connection identifier corresponding to a second connection to the database, the second connection differing from the first connection and initiating a database request including the second connection identifier for a database operation that is not one of the multiple database operations in the single transaction. As another example, the multiple database operations may represent operations deploying a plurality of artifacts to the database.

As another example, the method may further include determining that one of the multiple database operations failed, setting a connection poisoned flag for the connection identifier, and cancelling any requests in the connection queue with an operation failed response. In some implementations, the method may also include receiving a subsequent request that includes the connection identifier, determining that the connection poisoned flag is set, and rejecting addition of the subsequent request to the connection queue.

In one aspect, a computer program product tangibly embodied on a non-transitory computer-readable storage medium includes instructions that, when executed, are configured to cause at least one computing device to perform operations. The operations include receiving a request for a database connection from a requesting process, opening a physical database connection and associate a connection identifier with the physical database connection, and providing the connection identifier to the requesting process. The operations also include receiving a database request that includes a connection identifier, determining that the connection identifier in the database request matches the connection identifier for the physical database connection, adding the database request to a connection queue associated with the physical database connection; and executing database requests from the connection queue against the database via the physical database connection.

These and other aspects may include one or more of the following features, alone or in combination. For example, the operations may also include determining that one of the database requests from the connection queue failed, setting a connection poisoned flag for the physical database connection, and cancelling any requests in the connection queue with an operation failed response. In some implementations, the operations may also include determining that the connection poisoned flag is set, and preventing addition of subsequent requests to the connection queue. As another example, the operations may include associating the connection identifier with the physical connection in a memory. In some implementations, the memory stores a plurality of connection identifiers associated with a plurality of respective physical connections.

In another aspect, a system includes at least one memory including instructions on a computing device and at least one processor on the computing device, wherein the processor is operably coupled to the at least one memory and is arranged and configured to execute the instructions that, when executed, cause the processor to perform operations. The operations may include obtaining, responsive to a first request from a requesting client to perform a plurality of database operations in a single transaction, a connection identifier for a connection to a database, the connection to be used to execute the plurality database operations. The operations may also include storing the connection identifier and a connection active flag in a status table, the connection active flag having an initial value of true, providing the connection identifier to the requesting client, receiving a second request from the requesting client, the second request being for a status of the connection, and providing a response to the second request that includes a value of the connective active flag from the status table.

These and other aspects may include one or more of the following features, alone or in combination. For example, the operations may also include determining that a processing client is nonresponsive and setting, responsive to the determining, the value of the connection active flag for the connection identifier to false. As another example, the second request may be responsive to a user request for a status of the plurality of database operations. As another example, the plurality of database operations may represent operations deploying a plurality of artifacts to the database.

As another example, the operations may include initiating execution of the plurality of database operations and setting, subsequent to completion of the plurality of database operations, the value of the connection active flag for the connection identifier to false. In some implementations, the operations may include determining an outcome of the plurality of database operations and storing the outcome with the connection identifier in the state table. The outcome may indicate failure of the plurality of database operations or success of the plurality of database operations.

In one aspect, a computer-implemented method includes obtaining, responsive to a first request from a requesting client to perform a plurality of database operations in a single transaction, a connection identifier for a connection to a database, the connection to be used to execute the plurality database operations and storing the connection identifier and a connection active flag in a status table, the connection active flag having an initial value of true. The method also includes providing the connection identifier to the requesting client, receiving a second request from the requesting client, the second request being for a status of the connection, and providing a response to the second request that includes a value of the connective active flag from the status table.

These and other aspects may include one or more of the following features, alone or in combination. For example, the method may also include determining at a database server that a processing client is nonresponsive and setting, responsive to the determining, the value of the connection active flag for the connection identifier to false. As another example, the method may also include initiating execution of the plurality of database operations, and setting, subsequent to completion of the plurality of database operations, the value of the connection active flag for the connection identifier to false. In some implementations, the method may also include determining an outcome of the plurality of database operations and storing the outcome with the connection identifier in the state table. The outcome may represent failure of the plurality of database operations or success of the plurality of database operations. As another example, the second request may be responsive to a user request for a status of the plurality of database operations. As another example, the plurality of database operations may represent operations deploying a plurality of artifacts to the database.

In one aspect a computer program product tangibly embodied on a non-transitory computer-readable storage medium comprises instructions that, when executed, are configured to cause at least one computing device to perform operations. The operations include obtaining, at a processing client and responsive to a first request from a requesting client to perform a plurality of database operations in a single transaction, a connection identifier for a connection to a database on a database server, the connection to be used to execute the plurality database operations, and storing the connection identifier in a row of a status table, the existence of the row indicating a status of the connection is active. The operations also include providing the connection identifier to the requesting client, receiving a second request from the requesting client, the second request being for a status of the connection, determining whether the row still exists in the status table, and providing a response to the second request that indicates whether the row still exists in the status table.

These and other aspects may include one or more of the following features, alone or in combination. For example, the operations may also include determining, at the database server, that the processing client is nonresponsive and removing, responsive to the determining, the row for the connection identifier from the status table. As another example, the second request may be responsive to a user request for a status of the plurality of database operations.

As another example, the operations may include initiating execution of the plurality of database operations and removing, subsequent to completion of the plurality of database operations, the row for the connection identifier from the status table. In some implementations, the row includes a start time for the request and the start time is provided to the requesting client. In some such implementations, the row exists when the connection identifier and the start time provided in the second request matches a row in the status table.

In one aspect a computer program product tangibly embodied on a non-transitory computer-readable storage medium comprises instructions that, when executed, are configured to cause at least one computing device to perform operations. The operations include obtaining, at a processing client and responsive to a first request from a requesting client to perform a plurality of database operations in a single transaction, a connection identifier and start time for a connection to a database on a database server, the connection to be used to execute the plurality database operations, and storing the connection identifier and start time in a row of a status table. The operations also include providing the connection identifier and start time to the requesting client, receiving a second request from the requesting client, the second request being for a status of the connection identifier and start time, querying the database using the connection identifier and start time to determine whether the connection is still active, and providing a response to the second request that indicates whether the connection is still active.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
at least one memory including instructions on a computing device; and
at least one processor on the computing device, wherein the processor is operably coupled to the at least one memory and is arranged and configured to execute the instructions that, when executed, cause the processor to implement:
a worker pool having a plurality of workers and a work queue from which the plurality of workers obtain work items, wherein the work items comprise corresponding operations for deployment of design-time artifacts at a database, wherein the work items are defined as nodes of a dependency graph during a plurality of stages of preparation of the dependency graph, wherein the dependency graph at a first stage from the plurality of stages of preparation defines dependencies between design-time artifacts related to a first build phase from a plurality of build phases for deployment of the design-time artifacts at the database, wherein the first build phase is related to a first deployment operation for execution by a corresponding work item related to transforming a design-time artifact to a runtime object at the database, wherein the first deployment operation is executed based on the defined dependencies between the design-time artifacts related to the first build phase at the dependency graph at the first stage, and wherein the work items defined for the dependency graph at the first stage are independent from work items defined for the dependency graph at other stages from the plurality of stages of preparation, and
a process controller configured to:
request, responsive to a request to perform multiple deployment operations in relation to the design-time artifacts defined at the dependency graph, a connection identifier for a connection to the database, wherein the multiple deployment operations are performed at the database in a single transaction in a parallel manner by the plurality of workers, and
provide the connection identifier to each of the plurality of workers to provide database request to a database server, and
wherein the database server is configured to:
determine a physical connection that corresponds to the connection identifier, and
adding the request to a connection queue for a database client associated with the physical connection, the database client executing requests from the connection queue against the database via the physical connection.

2. The system of claim 1, wherein the process controller is further configured to:
request termination of the connection using the connection identifier after the multiple deployment operations have been executed.

3. The system of claim 1, wherein the connection to the database is a first connection and at least some of the workers of the worker pool are further configured to:
request a secondary connection identifier, the secondary connection identifier corresponding to a second connection to the database, the second connection differing from the first connection; and
initiate a database request including the second connection identifier for a database operation that is not one of the multiple deployment operations in the single transaction.

4. The system of claim 3, wherein the database operation that is not one of the multiple deployment operations is a write to a log record in the database.

5. The system of claim 3, wherein the database operation that is not one of the multiple deployment operations is unaffected by a rollback of the multiple deployment operations.

6. The system of claim 1, wherein the database client is configured to:
determining that one of the multiple deployment operations failed;
setting a connection poisoned flag for the connection identifier; and
cancelling any requests in the connection queue with an operation failed response.

7. The system of claim 6, wherein the database client is further configured to:
determine that the connection poisoned flag is set; and
reject addition of subsequent requests to the connection queue.

8. The system of claim 1, wherein the multiple deployment operations represent operations for deployment of a plurality of artifacts to the database.

9. A method comprising:
  requesting, responsive to a request to perform multiple deployment operations in relation to design-time artifacts defined at a dependency graph, a connection identifier for a connection to a database;
  providing the connection identifier to each of a plurality of workers, wherein the plurality of workers perform:
    obtaining a work item from work items from a work queue, wherein the work queue comprises work items defined at the dependency graph, wherein the work items comprise corresponding operations for deployment of the design-time artifacts at the database, wherein the work items are defined as nodes of the dependency graph during a plurality of stages of preparation of the dependency graph, wherein the dependency graph at a first stage of preparation defines dependencies between design-time artifacts related to a first build phase from a plurality of build phases for deployment of the design-time artifacts at the database, wherein the first build phase is related to a first deployment operation for execution by a corresponding work item related to transforming a design-time artifact to a runtime object at the database, wherein the first deployment operation is executed based on the defined dependencies between the design-time artifacts related to the first build phase at the dependency graph at the first stage of preparation, and wherein the work items defined for the dependency graph at the first stage are independent from work items defined for the dependency graph at other stages from the plurality of stages of preparation, wherein the dependency graph defines dependencies between the design-time artifacts, and wherein the deployment operations correspond to the first deployment operation related to the first build phase,
    initiating a database request for the work item, the database request representing one of the multiple deployment operations, wherein the request includes the connection identifier, and
    providing the database request to a database server.

10. The method of claim 9, further comprising:
  requesting termination of a physical connection using the connection identifier after the multiple deployment operations have been executed, wherein the database server executes requests against the database via the physical connection.

11. The method of claim 9, wherein the plurality of workers terminate when the multiple deployment operations have been executed.

12. The method of claim 9, wherein the connection to the database is a first connection and at least some of the plurality of workers are further configured to:
  request a secondary connection identifier, the secondary connection identifier corresponding to a second connection to the database, the second connection differing from the first connection; and
  initiate a database request including the second connection identifier for a database operation that is not one of the multiple deployment operations executed in a single transaction in a parallel manner by the plurality of workers.

13. The method of claim 9, further comprising:
  determining that one of the multiple deployment operations failed;
  setting a connection poisoned flag for the connection identifier; and
  cancelling any requests in the connection queue with an operation failed response.

14. The method of claim 13, further comprising
  receiving a subsequent request that includes the connection identifier;
  determining that the connection poisoned flag is set; and
  rejecting addition of the subsequent request to the connection queue.

15. The method of claim 9, wherein the multiple deployment operations represent operations deploying a plurality of artifacts to the database.

16. A computer program product tangibly embodied on a non-transitory computer-readable storage medium and comprising instructions that, when executed, are configured to cause at least one computing device to:
  receive a request for a database connection from a requesting process;
  open a physical database connection and associate a connection identifier with the physical database connection;
  provide the connection identifier to the requesting process, wherein the requesting process is executed by a plurality of workers in relation to work items obtained from a work queue, wherein the work items comprise corresponding operations for deployment of design-time artifacts at a database, wherein the work items are defined as nodes of a dependency graph during a plurality of stages of preparation of the dependency graph, wherein the dependency graph at a first stage of preparation defines dependencies between design-time artifacts related to a first build phase from a plurality of build phases for deployment of the design-time artifacts at the database, wherein the first build phase is related to a first deployment operation for execution by a corresponding work item related to transforming a design-time artifact to a runtime object at the database, wherein the first deployment operation is executed based on the defined dependencies between the design-time artifacts related to the first build phase at the dependency graph at the first stage, and wherein the work items defined for the dependency graph at the first stage are independent from work items defined for the dependency graph at other stages from the plurality of stages of preparation, wherein the connection identifier is provided to each of the plurality of workers;
  receive a database request that includes a connection identifier, wherein the database request includes a request to perform multiple deployment operations in relation to the design-time artifacts defined at the dependency graph, and wherein the multiple deployment operations are performed at the database as a single transaction in a parallel manner by the plurality of workers;
  determine that the connection identifier in the database request matches the connection identifier for the physical database connection;
  add the database request to a connection queue associated with the physical database connection; and
  execute database requests from the connection queue against the database via the physical database connection.

17. The computer program product of claim 16, further comprising instructions that, when executed, are configured to cause at least one computing device to:
- determine that one of the database requests from the connection queue failed;
- set a connection poisoned flag for the physical database connection; and
- cancel any requests in the connection queue with an operation failed response.

18. The computer program product of claim 17, further comprising instructions that, when executed, are configured to cause at least one computing device to:
- determine that the connection poisoned flag is set; and
- prevent addition of subsequent requests to the connection queue.

19. The computer program product of claim 16, further comprising instructions that, when executed, are configured to cause at least one computing device to:
- associate the connection identifier with the physical connection in a memory.

20. The computer program product of claim 19, wherein the memory stores a plurality of connection identifiers associated with a plurality of respective physical connections.

* * * * *